(12) United States Patent
Metoevi et al.

(10) Patent No.: US 9,100,656 B2
(45) Date of Patent: Aug. 4, 2015

(54) METHOD AND SYSTEM FOR EFFICIENT VIDEO TRANSCODING USING CODING MODES, MOTION VECTORS AND RESIDUAL INFORMATION

(75) Inventors: Isabelle Metoevi, Montreal (CA); Stephane Coulombe, Brossard (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 529 days.

(21) Appl. No.: 13/555,172

(22) Filed: Jul. 22, 2012

(65) Prior Publication Data

US 2012/0300834 A1 Nov. 29, 2012

Related U.S. Application Data

(63) Continuation-in-part of application No. 12/633,050, filed on Dec. 8, 2009, now Pat. No. 8,494,056.

(60) Provisional application No. 61/180,316, filed on May 21, 2009, provisional application No. 61/510,845, filed on Jul. 22, 2011.

(51) Int. Cl.
*H04N 19/40* (2014.01)
*H04N 19/513* (2014.01)
(Continued)

(52) U.S. Cl.
CPC ........... *H04N 19/521* (2014.11); *H04N 19/107* (2014.11); *H04N 19/109* (2014.11);
(Continued)

(58) Field of Classification Search
CPC . H04N 19/139; H04N 19/159; H04N 19/176; H04N 19/147; H04N 19/521; H04N 19/109; H04N 19/132; H04N 19/14; H04N 19/40; H04N 19/107
See application file for complete search history.

(56) References Cited

U.S. PATENT DOCUMENTS

| 5,983,251 | A | 11/1999 | Martens et al. |
| 7,620,107 | B2 | 11/2009 | Lee et al. |

(Continued)

FOREIGN PATENT DOCUMENTS

| EP | 2234083 | 6/2011 |
| JP | 09-182077 | 7/1997 |

(Continued)

OTHER PUBLICATIONS

A. Vetro, C. Christopoulos, and H. Sun, "Video transcoding architectures and techniques: An overview," IEEE Signal Processing Magazine, vol. 20, pp. 18-29, 2003.

(Continued)

*Primary Examiner* — Behrooz Senfi
*Assistant Examiner* — Mohammed Jebari
(74) *Attorney, Agent, or Firm* — IP-MEX Inc.; Victoria Donnelly

(57) ABSTRACT

An improved MPEG-4 to H.264 transcoding algorithm is provided, exploiting residual, coding mode and motion vector information from the MPEG-4 stream. The use of the relative sum of absolute residuals (RSAR) to classify macroblocks (MB) leads to small sets of coding modes (CM) to test, and significantly reduces the computational complexity. In addition, RSAR is used to conditionally refine motion vectors (MV); only those MVs most likely to lead to quality improvements are refined. The average RSAR statistics are obtained from the transcoding of the previous Inter frame to provide adaptive thresholds for coding mode selection as well as conditional MV refinement. A corresponding video transcoder system is also provided.

26 Claims, 21 Drawing Sheets

(51) Int. Cl.

| | |
|---|---|
| *H04N 19/159* | (2014.01) |
| *H04N 19/176* | (2014.01) |
| *H04N 19/147* | (2014.01) |
| *H04N 19/107* | (2014.01) |
| *H04N 19/109* | (2014.01) |
| *H04N 19/132* | (2014.01) |
| *H04N 19/14* | (2014.01) |
| *H04N 19/139* | (2014.01) |

(52) U.S. Cl.
CPC ........... *H04N19/132* (2014.11); *H04N 19/139* (2014.11); *H04N 19/14* (2014.11); *H04N 19/147* (2014.11); *H04N 19/159* (2014.11); *H04N 19/176* (2014.11); *H04N 19/40* (2014.11)

(56) References Cited

U.S. PATENT DOCUMENTS

| | | | |
|---|---|---|---|
| 8,411,756 | B2 | 4/2013 | Metoevi et al. |
| 2002/0176495 | A1 | 11/2002 | Vetro et al. |
| 2003/0016751 | A1 | 1/2003 | Vetro et al. |
| 2003/0201994 | A1 | 10/2003 | Taylor et al. |
| 2004/0114817 | A1 | 6/2004 | Jayant et al. |
| 2005/0025249 | A1* | 2/2005 | Zhao et al. ............... 375/240.24 |
| 2005/0175099 | A1 | 8/2005 | Sarkijarvi |
| 2006/0088191 | A1 | 4/2006 | Zhang |
| 2006/0245497 | A1 | 11/2006 | Tourapis |
| 2006/0256866 | A1* | 11/2006 | Ziauddin et al. ......... 375/240.15 |
| 2007/0030901 | A1 | 2/2007 | Joch et al. |
| 2007/0053441 | A1* | 3/2007 | Wang et al. ............... 375/240.24 |
| 2007/0058718 | A1 | 3/2007 | Shen et al. |
| 2007/0201554 | A1 | 8/2007 | Sihn |
| 2007/0230919 | A1 | 10/2007 | Bourge et al. |
| 2007/0285500 | A1 | 12/2007 | Ma et al. |
| 2008/0002770 | A1 | 1/2008 | Ugur |
| 2008/0019559 | A1 | 1/2008 | Wang et al. |
| 2008/0043831 | A1 | 2/2008 | Sethuraman et al. |
| 2008/0151106 | A1 | 6/2008 | Verburgh et al. |
| 2008/0152000 | A1 | 6/2008 | Kaushik |
| 2008/0152005 | A1 | 6/2008 | Oguz |
| 2008/0187046 | A1 | 8/2008 | Joch et al. |
| 2008/0205515 | A1 | 8/2008 | Kalva et al. |
| 2009/0083524 | A1 | 3/2009 | Van Wel |
| 2009/0103622 | A1 | 4/2009 | Tripathi et al. |
| 2009/0110066 | A1 | 4/2009 | Wang et al. |
| 2009/0129472 | A1* | 5/2009 | Panusopone et al. .... 375/240.16 |
| 2010/0020878 | A1* | 1/2010 | Liang et al. ............... 375/240.16 |
| 2010/0027662 | A1 | 2/2010 | Pigeon |
| 2010/0195716 | A1 | 8/2010 | Klein Gunnewiek et al. |
| 2010/0296580 | A1 | 11/2010 | Metoevi |
| 2010/0303154 | A1* | 12/2010 | Le Floch et al. ......... 375/240.16 |
| 2011/0075732 | A1 | 3/2011 | Wada et al. |
| 2012/0027091 | A1 | 2/2012 | Hsu |
| 2012/0027092 | A1 | 2/2012 | Matsui |

FOREIGN PATENT DOCUMENTS

| | | |
|---|---|---|
| JP | 11-239354 | 8/1999 |
| JP | 2004-129099 | 4/2004 |
| JP | 2004-199222 | 7/2004 |

OTHER PUBLICATIONS

I. Ahmad, X. Wei, Y. Sun, and Y.-Q. Zhang, "Video transcoding: An overview of various techniques and research issues," IEEE Transactions on Multimedia, vol. 7, pp. 793-804, 2005.
J. Xin, C.-W. Lin, and M.-T. Sun, "Digital video transcoding," Proceedings of the IEEE, vol. 93, pp. 84-97, 2005.
T. Wiegand, H. Schwarz, A. Joch, F. Kossentini, and G. J. Sullivan, "Rate-constrained coder control and comparison of video coding standards," IEEE Transactions on Circuits and Systems for Video Technology, vol. 13, pp. 688-703, 2003.
ISO/IEC 14496-10 AVC and ITU-T rec. H.264, "Advanced video coding for generic audiovisual services," Mar. 2009.
ISO/IEC 14496-2, "Information technology—Coding of audio-visual objects—Part 2: Visual," second edition, Dec. 2001.
T. Shanableh and M. Ghanbari, "Heterogeneous video transcoding to lower spatio-temporal resolutions and different encoding formats," IEEE Transactions on Multimedia, vol. 2, pp. 101-110, 2000.
X. Jun, S. Ming-Ting, and C. Kangwook, "Motion Re-estimation for MPEG-2 to MPEG-4 Simple Profile Transcoding," in Int. Packet Video Workshop Pittsburgh, 2002.
Y. Jeongnam, S. Ming-Ting, and L. Chia-Wen, "Motion vector refinement for high-performance transcoding," IEEE Transactions on Multimedia, vol. 1, pp. 30-40, 1999.
H. Sun, W. Kwok, and J. W. Zdepski, "Architectures for MPEG compressed bitstream scaling," IEEE Transactions on Circuits and Systems for Video Technology, vol. 6, pp. 191-199, 1996.
Z. Peng, H. Qing-Ming, and G. Wen, "Key techniques of bit rate reduction for H.264 streams," Berlin, Germany, 2004, pp. 985-992.
W. Zhu, K. H. Yang, and M. J. Beacken, "CIF-to-QCIF video bitstream down-conversion in the DCT domain," Bell Labs Technical Journal, vol. 3, pp. 21-29, 1998.
Liu, B., Zaccarin, A.; "New fast algorithms for the estimation of block motion vectors" Circuits and Systems for Video Technology, IEEE Transactions on, vol. 3, No. 2, pp. 148-157, Apr. 1993 doi: 10.1109/76.212720.
ISO/IEC 14496-10 AVC and ITU-T rec. H.264, "Advanced video coding for generic audiovisual services," Mar. 2005.
3GPP TS 26.234 v10.1.0, "Packet-switched Streaming Service (PSS); Protocols and codecs (Release 10)," Jun. 2011.
3GPP TS 26.140 v10.0.0, "Multimedia Messaging Service (MMS); Media formats and codecs (Release 10)," Mar. 2011.
3GPP2 C.S0045-A, "Multimedia Messaging Service (MMS) Media Format and Codecs for cdma2000 Spread Spectrum Systems," version 1.0, Mar. 2006.
3GPP2 C.S0046-0, "3G Multimedia Streaming Services," version 1.0, Feb. 2006.
B. Shen, "From 8-Tap DCT to 4-Tap Integer-Transform for MPEG-4 to H.264/AVC Transcoding," IEEE International Conference on Image Processing, vol. 1, pp. 115-118, Oct. 2004.
Y. K. Lee, S. S. Lee and Y. L. Lee, "MPEG-4 to H.264 Transcoding using Macroblock Statistics," IEEE International Conference on Multimedia and Expo, pp. 57-60, Jul. 2006.
T. N. Dinh, J. Yoo, S. Park, G. Lee, T. Y. Chang and H. J. Cho, "Reducing Spatial Resolution for MPEG-4 / H.264 Transcoding with Efficient Motion Reusing," IEEE Seventh International Conference on Computer and Information Technology, pp. 577-580, Oct. 2007.
S. E. Kim, J. K. Han and J. G. Kim, "Efficient Motion Estimation Algorithm for MPEG-4 to H.264 Transcoder," IEEE International Conference on Image Processing, vol. 3, pp. 659-702, Sep. 2005.
T. D. Nguyen, G. S. Lee, J. Y. Chang and H. J. Cho, "Efficient MPEG-4 to H.264/AVC Transcoding with Spatial Downscaling," ETRI, vol. 29, pp. 826-828, Dec. 2007.
Y. Liang, X. Wei, I. Ahmad and V. Swaminahan, "MPEG-4 to H.264/AVC Transcoding," The International Wireless Communications and Mobile Computing Conference, pp. 689-693, Aug. 2007.
I. Metoevi, S. Coulombe, "Efficient MPEG-4 to H.264 transcoding exploiting MPEG-4 block modes, motion vectors, and residuals," ISCIT (International Symposium on Communications and Information Technologies), Incheon, South Korea, Sep. 2009.
ITU-T/SG16, "Video codec test model, TMN8," Portland, Jun. 1997.
K.P. Lim, G. Sullivan and T. Wiegand, "Text Description of Joint Model Reference Encoding Methods and Decoding Concealment Methods," Joint Video Team Document JVT-0079, Apr. 2005.
H.R. Lindman, "Analysis of variance in complex experimental designs," W.H. Freeman & Co. Hillsdale, NJ USA, 1974.
J. R. Jain and A. K. Jain, "Displacement Measurement and its Application in Interframe Image Coding," IEEE Transactions on Communications, vol. COM-29, pp. 1709-1808, Dec. 1981.
Intel Integrated Performance Primitives 5.3—Code Samples. [Online]. http://software.intel.com/en-us/articles/intel-integrated-performance-primitives-code-samples/.

(56) References Cited

OTHER PUBLICATIONS

SO/IEC 14496-5:2001, "Information technology—Coding of audio-visual objects—Part 5: Reference software," second edition, Feb. 2005, http://www.iso.org/iso/hoem/store/catalogue.
H.264/AVC reference software JM 15.1. [Online]. http://iphome.hhi.de/suehring/tml/.
A.M. Tourapis, "Enhanced Predictive Zonal Search for Single and Multiple Frame Motion Estimation," Visual Communications and Image Processing, pp. 1069-1079, Jan. 2002.
A.M. Tourapis, O.C. Au and M.L. Liou, "Predictive Motion Vector Field Adaptive Search Technique (PMVFAST)—Enhancing Block Based Motion Estimation," Department of Electrical and Electronic Engineering, Hong Kong University of Science and Technology, Hong Kong, 2000.
Y.K. Lee et al., MPEG-4 to H.264 Transcoding, IEEE Tencon, Nov. 2005, P. 6, Ecole de Technologie Superieure.
3GPP, Technical Specification Group Services and System Aspects, Transparent end-to-end Packet-switched Streaming Service (PSS), Protocols and codecs (Release 7), Mar. 2009, p. 17, 3GPP.
3GPP, Technical Specification Group Services and System Aspects, Multimedia Messaging Service (MMS), Media formats and codecs (Release 7), Jun. 2007, p. 17, 3GPP.
S.E. Kim et al., Efficient Motion Estimation Algorithm for MPEG-4 to H.264 Transcoder, IEEE International Conference on Image Processing (ICIP), vol. 3, pp. 659-702, Sep. 2005.
J. Bialkowski et al., Overview of Low-Complexity Video Transcoding from H.263 to H.264, IEEE International Conference on Multimedia and Expo, Jul. 2006, pp. 49-52.
G. Sullivan, Draft Text of Recommendation H.263 Version 2 ("H.263+") for Decision, Sep. 25, 1997, ITU.
S. Zhu et al., A New Diamond Search Algorithm for Fast Block-Matching Motion Estimation, IEEE Transactions on Image Processing, vol. 9, No. 2, Feb. 2000, pp. 287-290, IEEE.
S. Borman, M. A. Robertson, R. L. Stevenson, "Block-matching subpixel motion estimation from noisy undersampled frames: an empirical performance evaluation," Proc. SPIE 3653, Visual Communications and Image Processing '99, 1442 (Dec. 28, 1998); doi: 10.1117/12.334654.
Intel Integrated Performance Primitives 5.3—Code Samples. [Online]. http://software.intel.com/en-us/articles/intelintegrated-performance-primitives-code-samples/ (last accessed Sep. 2, 2008).
H.264/AVC reference software JM 15.1. [Online]. http://iphome.hhi.de/suehring/tml/ (last accessed Mar. 2, 2009).
J. Bialkowski, M. Menden, M. Barkowsky, K. Illgner, A. Kaup, "A fast H.263 to H.264 inter-frame transcoder with motion vector refinement," presented at the Picture Coding Symposium (PCS), San Francisco, Dec. 2004.
J. Bialkowski, M. Barkowsky, and A. Kaup, "Fast video transcoding from H.263 to H.264/MPEG-4 AVC," Multimedia Tools Appl. 35, 2 (Nov. 2007), pp. 127-146, 2007; doi:10.1007/s11042-007-0126-7.
Q. Tang, P. Nasiopoulos, R. Ward "Fast block size prediction for MPEG-2 to H.264/AVC transcoding," Acoustics, Speech and Signal Processing, 2008. ICASSP 2008. IEEE International Conference on , vol., No., pp. 1029-1032, Mar. 31-Apr. 4, 2008; doi: 10.1109/ICASSP.2008.4517788.
V. Bhaskaran, K. Konstantinides. Image and Video Compression Standards: Algorithms and Architectures (2nd ed.) (The Springer International Series in Engineering and Computer Science). Kluwer Academic Publishers, Norwell, MA, USA, Jun. 1997, 472 pages.
H.R Lindman Analysis of variance in complex experimental designs, W.H. Freeman &Co, Hillsdale, N J USA, 1974, pp. 21-50, pp. 88-136.
ISO/IEC 14496-5:2001, "Information technology—Coding of audio-visual objects—Part 5: Reference software", second edition, Feb. 2005.
3GPP2 C.S0045-A, "Multimedia Messaging Service (MMS) Media Format and Codecs for cdma2000 Spread Spectrum Systems", version 1.0, Mar. 2006.
M. Alberink et al., GigaCE/D1.11 project, Telematica Instituut, Enschede, The Netherlands, Jul. 21, 2001.
Hur, Jae-Ho and Lee, Yung-Lyul Lee "H.264 to MPEG-4 Transcoding Using Block Type Information" TENCON 2005, Melbourne, pp. 1-6 Nov. 24, 2005.
Oh, Seung-Kyun et al. "Motion Vector Estimation and Adaptive Refinement for the MPEG-4 to H264/AVC Video Transcoder" Dec. 4-7, 2006.
Nguyen et al. "Efficient Video Transcoding Between H.263 and H.264/AVC Standards" May 23-26, 2005.
Nguyen et al. "Efficient Video Transcoding from H.263 to H.264/AVC Standard with Enhanced Rate Control" Shcool of Electrical & Electronic Engineering, Mayang Technological University, Journal on Applied Signal Processing, vol. 2006, pp. 1-15, Feb. 18, 2006.
ISR and WO, CA, Apr. 7, 2009, PCT.
S.Borman, M. Robertson and R.L. Stevenson "Block-Matching Sub-Pixel Motion Estimation from Noisy, Under-Sampled Frames—An Empirical performance Evaluation" SPIE Visual Communications and Image Processing Conference 1999.
W. Li and E. Salari "Successive Elimination Algorithm for Motion Estimation", IEEE Transactions on Image Processing, vol. 4, Issue 1, Jan. 1995, pp. 105-107.
F. Tombari, S. Mattocia, L. Di Stefano, "Template Matching Based on Lp Norm Using Sufficient Conditions with Incremental Approximation", IEEE International Conference on Video and Signal Based Surveillance, Nov. 2006, p. 20.
U. Koc and K.J.R. Liu, "Interpolation-free Subpixel Motion Estimation Technique in DCT Domain", IEEE Transactions on Circuits and Systems for Video Technology, vol. 8, Issue 4, Aug. 1998, pp. 460-487.
S. Lee, S.-I Chae, "Motion Estimation Algorithm using Low Resolution Quantization", Electronic Letters, vol. 21. No. 7, Mar. 28, 1996, p. 647.
C.-K. Cheung, L.-M. Po, "A Hierarchical Block Motion Estimation Algorithm using Partial Distortion Measure" IEEE International Conference on Image Processing, vol. 3, Oct. 1997, pp. 606-609.
Y.-L. Chan, W.-C. Siu, "New Adaptive Pixel Decimation for Block Motion Vector Estimation", IEEE Transactions on Circuits and Systems for Video Technology, vol. 6, Issue 1, Feb. 1996, pp. 113-118.
S. Suthaharan, S.-W. Kim, and K.R. Rao "A new quality metric based on just-noticeable difference, perceptual regions, edge extraction, and human vision", Canadian Journal Electr. Comput. Eng., vol. 30, No. 2, Spring 2005.
T. Toivonen and J. Heikkila "Efficient Method for Half-Pixel Block Motion Estimation Using Block Differentials", Published by Springer-Verlag, International Workshop VLBV, Madrid, Spain, Sep. 18-19, 2003.
K.-C. Hui, W.-C. Siu, and Y.-L. Chan "New Adaptive Partial Distortion Search Using Clustered Pixel Matching Error Characteristic" IEEE Transactions on Image Processing, vol. 14, No. 5., May 2005 p. 597.
C. J. Duanmu, M. O. Ahmad "Fast Block Motion Estimation With 8-Bit Partial Sums Using SIMD Architectures" IEEE Transactions of Circuits and Systems for Video Technology, vol. 17, No. 8, Aug. 2007, p. 1041.
B. Liu, A. Zaccarin "New Fast Algorithms for the Estimation of Block Motion Vectors" IEEE Transactions on Circuits and Systems for Video technology, vol. 3, No. 2, Apr. 1993, p. 148.
3GPP2 C.S0045-A, Multimedia Messaging Service (MMS) Media Format and Codecs for cdma2000 Spread Spectrum Systems, Version 1.0, Mar. 31, 2006, p. 22, 3GPP2.
A. Vetro et al., Video Transcoding Architectures and Techniques: An Overview, IEEE Signal Processing Magazine, 20(2):Mar. 18-29, 2003.
B.G. Kim et al., Enhanced Inter Mode Decision Based on Contextual Prediction for P-slices in H.264/AVC Video Coding, ETRI Journal, vol. 28, No. 4, Aug. 2006, pp. 425-434.
P. A. A. Assuncao and M. Ghanbari, "Post-processing of MPEG2 coded video for transmission at lower bit rates," in Proceedings of the 1996 IEEE International Conference on Acoustics, Speech, and Signal Processing, ICASSP. Part 4 (of 6). vol. 4: IEEE, Piscataway, NJ, USA, 1996, pp. 1998-2001.
N. Bjork and C. Christopoulos, "Transcoder architectures for video coding," IEEE Transactions on Consumer Electronics, vol. 44, pp. 88-98, 1998.

(56) References Cited

OTHER PUBLICATIONS

K. Panusopone, X. Chen, and F. Ling, "Logo insertion in MPEG transcoder," in 2001 IEEE Interntional Conference on Acoustics, Speech, and Signal Processing. vol. 2: Institute of Electrical and Electronics Engineers Inc., 2001, pp. 981-984.

J. Youn, J. Xin, and M.-T. Sun, "Fast video transcoding architectures for networked multimedia applications," in Proceedings of the IEEE 2000 Internaitonal Symposium on Circuits and Systems. vol. 4: Institute of Electrical and Electronics Engineers Inc., Piscataway, NJ, USA, 2000, pp. 25-28.

N. Feamster and S. Wee, "An MPEG-2 to H.263 transcoder," in Multimedia Systems and Applications II. vol. 3845: SPIE-Int. Soc. Opt. Eng, 1999, pp. 164-175.

Y.-K. Lee and Y.-L. Lee, "MPEG-4 to H.264 transcoding," in TENCON 2005—2005 IEEE Region 10 Conference. vol. 2007: Institute of Electrical and Electronics Engineers Inc., Piscataway, NJ 08855-1331, United States, 2007, p. 4084891.

I. Metoevi and S. Coulombe, "Efficient MPEG-4 to H.264 transcoding exploiting MPEG-4 block modes, motion vectors, and residuals," 2009 9th International Symposium on Communications and Information Technology, ISCIT 2009, Icheon, Korea, Republic of, 2009, pp. 224-229.

J. Bialkowski, M. Barkowsky, and A. Kaup, "Overview of low-complexity video transcoding from H.263 to H.264," in 2006 IEEE International Conference on Multimedia and Expo, ICME 2006. vol. 2006: Institute of Electrical and Electronics Engineers Computer Society, 2006, pp. 49-52.

P. List, A. Joch, J. Lainema, G. Bjontegaard, and M. Karczewicz, "Adaptive deblocking filter," IEEE Transactions on Circuits and Systems for Video Technology, vol. 13, pp. 614-619, 2003.

L. Qiang, L. Xiaodong, and D. Qionghai, "Motion information exploitation in H.264 frame skipping transcoding," in 9th International Conference on Advanced Concepts for Intelligent Vision Systems, ACIVS 2007. vol. 4678 NCS: Springer Verlag, Heidelberg, D-69121, Germany, 2007, pp. 768-776.

L. Chih-Hung, W. Chung-Neng, and C. Tihao, "A fast downsizing video transcoder based on H.264/AVC standard," in Advances in Multimedia Information Processing—PCM 2004. 5th Pacific Rim Conference on Multimedia. Proceedings, Part III: Springer-Verlag, 2004, pp. 215-223.

X. Di and P. Nasiopoulos, "Logo insertion transcoding for H.264/AVC compressed video," Piscataway, NJ, USA, 2009, pp. 3693-3696.

J. Zhang and A. T. S. Ho, "Efficient video authentication for H.264/AVC," Los Alamitos, CA, USA, 2006, p. 4 pp.

J.-H. Hur and Y.-L. Lee, "H.264 to MPEG-4 transcoding using block type information," in TENCON 2005—2005 IEEE Region 10 Conference. vol. 2007: Institute of Electrical and Electronics Engineers Inc., Piscataway, NJ 08855-1331, United States, 2007, p. 4084887.

J.-H. Hur and Y.-L. Lee, "H.264 to MPEG-4 resolution reduction transcoding," in TENCON 2005—2005 IEEE Region 10 Conference. vol. 2007: Institute of Electrical and Electronics Engineers Inc., Piscataway, NJ 08855-1331, United States, 2007, p. 4084886.

Intel Integrated Performance Primitives 5.3—Code Samples. [Online]. http://software.intel.com/en-us/articles/intel-integrated-performanceprimitives-code-samples/.

H.264/AVC reference software JM 16.1. [Online]. http://iphome.hhi.de/suehring/tml/.

ISO/IEC 14496-5:2001, "Information technology—Coding of audiovisual objects—Part 5: Reference Software," second edition, Feb. 2005.

* cited by examiner

Table 210: QCIF statistics for 32kbps

| H264 CMs / MPEG-4 CMs | Intra 4x4 | Intra 16x16 | PCM | Skip | Inter 16x16 | Inter 16x8 | Inter 8x16 | Inter 8x8 | sb8x8 | sb8x4 | sb4x8 | sb4x4 |
|---|---|---|---|---|---|---|---|---|---|---|---|---|
| Intra | 64.2% | 26.1% | 0.0% | 7.8% | 1.6% | 0.1% | 0.1% | 0.1% | 100.0% | 0.0% | 0.0% | 0.0% |
| Inter16x16(64%) | 0.3% | 1.9% | 0.0% | 66.2% | 27.7% | 2.0% | 1.8% | 0.1% | 99.8% | 0.1% | 0.1% | 0.0% |
| Inter8x8(21%) | 2.9% | 3.8% | 0.0% | 21.7% | 39.5% | 14.9% | 16.6% | 0.4% | 98.1% | 0.5% | 0.7% | 0.7% |
| Skip(15%) | 0.1% | 0.6% | 0.0% | 92.3% | 6.8% | 0.1% | 0.1% | 0.0% | 0.0% | 0.0% | 0.0% | 0.0% |

Table 220: QCIF statistics for 160kbps

| H264 CMs / MPEG-4 CMs | Intra 4x4 | Intra 16x16 | PCM | Skip | Inter 16x16 | Inter 16x8 | Inter 8x16 | Inter 8x8 | sb8x8 | sb8x4 | sb4x8 | sb4x4 |
|---|---|---|---|---|---|---|---|---|---|---|---|---|
| Intra | 73.8% | 21.6% | 0.0% | 1.8% | 1.9% | 0.3% | 0.2% | 0.4% | 100.0% | 0.0% | 0.0% | 0.0% |
| Inter16x16(64%) | 1.0% | 2.7% | 0.0% | 28.5% | 54.9% | 6.0% | 5.8% | 1.1% | 98.5% | 0.4% | 0.4% | 0.7% |
| Inter8x8(21%) | 6.7% | 1.0% | 0.0% | 1.0% | 22.8% | 10.4% | 16.5% | 41.6% | 78% | 3.8% | 6.0% | 12.2% |
| Skip(15%) | 0.1% | 0.6% | 0.0% | 85.7% | 12.9% | 0.3% | 0.2% | 0.2% | 100.0% | 0.0% | 0.0% | 0.0% |

*Fig. 2*

| MPEG-4 CMs \ H264 CMs | Intra 4×4 | Intra 16×16 | PCM | Skip | Inter 16×16 | Inter 16×8 | Inter 8×16 | Inter 8×8 | sb8×8 | sb8×4 | sb4×8 | sb4×4 |
|---|---|---|---|---|---|---|---|---|---|---|---|---|
| Inter16×16(64%) | 0.4% | 2.9% | 0.0% | 63.6% | 29.6% | 2.0% | 1.9% | 0.2% | 100.0% | 0.0% | 0.0% | 0.0% |
| Inter16×16 case I(12%) | 0.0% | 1.1% | 0.0% | 92.3% | 6.2% | 0.2% | 0.1% | 0.0% | 100.0% | 0.0% | 0.0% | 0.0% |
| Inter16×16 case II(41%) | 0.3% | 2.5% | 0.0% | 67.3% | 26.4% | 1.6% | 1.7% | 0.2% | 100.0% | 0.0% | 0.0% | 0.0% |
| Inter16×16 case III(11%) | 0.6% | 5.0% | 0.0% | 13.9% | 62.5% | 9.0% | 8.4% | 0.5% | 100.0% | 0.0% | 0.0% | 0.0% |

Table 1310: Statistics for several QCIF videos at 32kbps using Intel's H.264 encoder

| MPEG-4 CMs \ H264 CMs | Intra 4×4 | Intra 16×16 | PCM | Skip | Inter 16×16 | Inter 16×8 | Inter 8×16 | Inter 8×8 | sb8×8 | sb8×4 | sb4×8 | sb4×4 |
|---|---|---|---|---|---|---|---|---|---|---|---|---|
| Inter16×16(64%) | 0.5% | 2.0% | 0.0% | 29.2% | 54.0% | 6.7% | 6.5% | 1.1% | 98.2% | 0.5% | 0.5% | 0.8% |
| Inter16×16 case I(10%) | 0.0% | 0.9% | 0.0% | 79.2% | 17.9% | 1.2% | 0.7% | 0.1% | 100.0% | 0.0% | 0.0% | 0.0% |
| Inter16×16 case II(29%) | 0.2% | 2.6% | 0.0% | 34.8% | 53.0% | 4.2% | 4.1% | 1.1% | 98.3% | 0.3% | 0.4% | 0.0% |
| Inter16×16 case III(25%) | 1.2% | 1.3% | 0.0% | 7.3% | 64.6% | 12.1% | 12.3% | 1.2% | 95.4% | 0.9% | 1.2% | 2.5% |

Table 1320: Statistics for several QCIF videos at 160kbps using Intel's H.264 encoder

METHOD AND SYSTEM FOR EFFICIENT VIDEO TRANSCODING USING CODING MODES, MOTION VECTORS AND RESIDUAL INFORMATION

RELATED APPLICATIONS

The present application is a Continuation-in-Part of U.S. patent application Ser. No. 12/633,050 filed on Dec. 08, 2009, which has now issued into a U.S. Pat. No. 8,494,056 on Jul. 23, 2013, which claims priority from the U.S. provisional application Ser. No. 61/180,316 filed on May 21, 2009; the present application also claims priority from U.S. provisional application Ser. No. 61/510,845 filed on Jul. 22, 2011, entire contents of the above noted patent applications being incorporated herein by reference.

FIELD OF THE INVENTION

The present invention relates to transcoding of videos, and in particular, to a method and system for MPEG-4 to H.264 transcoding using MPEG-4 block modes, motion vectors, and residuals.

BACKGROUND OF THE INVENTION

Current mobile terminals support different video standards, such as H.263, MPEG-4, both of which are described in standards document *ISO/IEC* 14496-2, *"Information technology—Coding of audio-visual Objects—Part 2: Visual,"* second edition, December 2001, and H.264/AVC which is described in standards document *ISO/IEC* 14496-10 *AVC and ITU-T rec. H.*264, *"Advanced video coding for generic audio-visual services,"* March 2005. The MPEG-4 visual simple profile (VSP) is widely used in today's multimedia services, including mobile videoconferencing, multimedia message services (MMS), and streaming within the scope of 3GPP/3GPP2 services, variously described in: 3*GPP TS* 26.234 v10.1.0, *"Packet-switched Streaming Service (PSS), Protocols and codecs (Release* 10)," June 2011; 3*GPP TS* 26.140 v10.0.0, *"Multimedia Messaging Service (MMS), Media formats and codecs (Release* 10)," March 2011; 3*GPP*2 *C.S*0045-*A, "Multimedia Messaging Service (MMS) Media Format and Codecs for cdma*2000 *Spread Spectrum Systems,"* version 1.0, March 200; and 3*GPP*2 *C.S*0046-0, "3*G Multimedia Streaming Services,"* version 1.0, February 2006. The relatively recent H.264/AVC standard provides significant improvements in compression efficiency, and is gradually replacing earlier standards, thereby making the need for transcoding from MPEG-4 to H.264 inevitable.

MPEG-4 to H.264 transcoding may be performed using the cascade approach, which consists of fully decoding the MPEG-4 bitstream into the pixel domain and then re-encoding it according to H.264 specifications. Though excellent quality is achieved using this approach, it is however computationally highly complex because it requires a complete H.264 encoding of the video frames, ignoring valuable information available from the MPEG-4 stream. As a result, other approaches and algorithms have been proposed to reduce the transcoding computational complexity. The following references give examples of other approaches:

B. Shen, "From 8-Tap DCT to 4-Tap Integer-Transform for MPEG-4 to H.264/AVC Transcoding,"*IEEE International Conference on Image Processing*, Vol. 1, pp. 115-118, October 2004;

Y. K. Lee, S. S. Lee and Y. L. Lee, "MPEG-4 to H.264 Transcoding using Macroblock Statistics," *IEEE International Conference on Multimedia and Expo*, pp. 57-60, July 2006;

S. E. Kim, J. K. Han and J. G. Kim, "Efficient Motion Estimation Algorithm for MPEG-4 to H.264 Transcoder," *IEEE International Conference on Image Processing*, Vol. 3, pp. 659-702, September 2005;

T. D. Nguyen, G. S. Lee, J. Y. Chang and H. J. Cho, "Efficient MPEG-4 to H.264/AVC Transcoding with Spatial Downscaling," *ETRI*, Vol. 29, pp. 826-828, December 2007;

Y. Liang, X. Wei, I. Ahmad and V. Swaminahan, "MPEG-4 to H.264/AVC Transcoding," *The International Wireless Communications and Mobile Computing Conference*, pp. 689-693, August 2007.

To speed up the encoding process, such methods extract information during the decoding stage (motion vectors, block modes, residual information, transform data) and use it to skip or simplify certain re-encoding steps. In the paper by Y. K. Lee, S. S. Lee and Y. L. Lee, "MPEG-4 to H.264 Transcoding using Macroblock Statistics," *IEEE International Conference on Multimedia and Expo*, pp. 57-60, July 2006, the authors exploit the frequency distribution of the H.264 block modes for a given MPEG-4 block mode in order to derive an MPEG-4 to H.264 block mode conversion table. Motion vectors (MVs) from MPEG-4 are then reused after a refinement process. However, the authors do not provide much detail on this process, and the simulation results are not extensive.

In the paper by Y. Liang, X. Wei, I. Ahmad and V. Swaminahan, "MPEG-4 to H.264/AVC Transcoding," *The International Wireless Communications and Mobile Computing Conference*, pp. 689-693, August 2007, an arbitrary mapping between MPEG-4 and H.264 candidate block modes is presented for both Intra and Inter blocks, without much justification. Depending on the corresponding H.264 mode to test, MPEG-4 MVs are either reused directly or serve as the starting points for a new motion estimation (ME). The authors obtain good speedups, a factor of 3.2 on average, but the quality loss is usually high often as high as 2 dB for Quarter Common Intermediate Format (QCIF) videos of 176×144 pixel frame size at low bit rates which may be unacceptable in several applications.

However, in spite of existing methods for improving video transcoding, the industry demands for speedy processing still require a further development of yet further improved methods and systems for video transcoding, which would have improved characteristics over the prior art.

SUMMARY OF THE INVENTION

Therefore there is an object of the invention to provide an improved method and system for efficient transcoding of video using coding modes, motion vectors and residual information, which would overcome or mitigate shortcomings of the prior art.

According to one aspect of the invention, there is provided a method of improving efficiency in transcoding a video sequence comprised of input Inter frames, each input Inter frame comprising one or more input macro blocks of pixels encoded in a first format, into a sequence of output Inter frames, each output Inter frame comprising one or more output macro blocks of pixels encoded in a second format, the method comprising:

(a) determining a set of candidate coding modes for a macro block of the second format depending on coding modes used for coding macro blocks of the first format, comprising limiting the set of candidate coding modes based on comparison of residual information of a macro block of the first format, which is to be transcoded into the macro block in the second format, and residual information of two or more macro blocks of the first format already transcoded for one or more of the previous frames in the sequence of input frames;

(b) determining, for each candidate coding mode in the set of the candidate coding modes, a value of a cost function, characterizing distortion and bitrate for the macro block; and (c) selecting a coding mode for the macro block of the second format from among the set of the candidate coding modes, the selected coding mode having the lowest value of the cost function.

In the embodiments of the invention, the step (a) comprises determining the set of candidate coding modes based on the size of the macro block, coding modes of the macro block, and a position of an Inter frame containing the macro block in the sequence of input Inter frames.

Conveniently, one of the previous frames is an immediately previous frame to a frame containing the macro block of the first format.

To save computation time, the residual information for the macro block or for the two or more macro blocks may be computed using less than all pixels of said two or more macro blocks.

In one embodiment of the invention, the two or more macro blocks of the first format from the one or more of the previous frames comprise all macro blocks of the first format.

In the method described above, the step of limiting based on comparison comprises determining relative residual information for the macro block of the first format with respect to the residual information of the two or more macro blocks of the first format.

In one embodiment of the invention, the relative residual information is computed as a ratio of a first function of residuals of the macro block of the first format and a second function of residuals of the two or more macro blocks belonging to the same Inter frame as said macro block of the first format. For example, the first function is a sum of absolute residuals, and the second function is an average sum of absolute residuals.

In an embodiment of the invention, the residual information of the two or more macro blocks of the first format is computed as average relative residual information over a combination of input and output coding modes.

The relative residual information may comprise adjusted relative average residual information of the two or more macro blocks coded with the same coding mode, an adjustment depending on the coding mode. The two or more macro blocks of the first format comprise macro blocks having been coded in the same coding mode, when in the first format, as the macro block the first format.

In the method described above, the step (a) further comprises limiting the set candidate coding modes based on comparison between motion vectors for the macro block in the first format and predicted motion vectors for the macro block in the second format.

The method further comprises refining motions vectors for the candidate coding modes except those where a coding mode for the macro block in the first format is the same as a coding mode for the macro block in the second format, and where a residual information of the macro block of the first format does not exceed a threshold associated with average relative residual information of two or more macro blocks of the first format already transcoded for one of the previous frames in the sequence of input frames, the macro block in the first format and the two or more macro blocks of the first format being coded in the same coding mode.

For example, the threshold is equal to one of the following: the average relative residual information of the two or more macro blocks; or a fraction of the average relative residual information of the two or more macro blocks.

In the method described above, the first format is MPEG-4 and the second format is H.264.

In the method described above, the cost function is a Lagrangian Cost Computation function.

In one embodiment of the invention, the threshold is computed as an adjusted average sum of absolute values for the residual (ASAR) information of two or more macro blocks of the first format already transcoded for one of the previous frames in the sequence of input Inter frames, the macro block in the first format and the two or more macro blocks of the first format being coded in the same coding mode.

According to another aspect of the invention, there is provided a method of transcoding a video sequence comprised of input Inter frames, each input inter frame comprising one or more input macro blocks of pixels encoded in a first format, into a sequence of output Inter frames, each output Inter frame comprising one or more output macro blocks of pixels encoded in a second format, the method comprising:

(a) determining a set of candidate coding modes for a macro block of the second format based on comparison of residual information of a macro block of the first format to be transcoded into the macro block in the second format, and relative residual information of two or more macro blocks of the first format already transcoded for an Inter frame previous to a frame containing the macro block of the first format;

(b) refining motions vectors for the candidate coding modes unless the residual information of the macro block of the first format does not exceed a threshold associated with the residual information of the two or more macro blocks of the first format for a previous frame;

(c) determining, for each candidate coding mode in the set of the candidate coding modes, a value of a cost function, characterizing distortion depending on the refined motion vectors and a bitrate for the macro block; and (d) selecting a coding mode for the macro block of the second format from among the set of the candidate coding modes, the selected coding mode having the lowest value of the cost function.

According to yet another aspect of the invention, there is provided a video transcoder system for transcoding a video sequence comprised of input Inter frames, each input Inter frame comprising one or more input macro blocks of pixels encoded in a first format, into a sequence of output Inter frames, each output frame comprising one or more output macro blocks of pixels encoded in a second format, the system comprising:

a computer, having a non-transitory computer readable storage medium having computer executable instructions stored thereon for execution by the computer, forming:

a decoder for decoding the input Inter frames into a video signal;

an encoder for generating the output Inter frames by encoding the video signal;

a metadata gathering module, gathering metadata from the decoder, including input macro block information including residual information and coding modes of the first format;

a transcoder control sub-system configured to:
(a) determine a set of candidate coding modes for a macro block of the second format depending on coding modes used for coding macro blocks of the first format, comprising limiting the set of candidate coding modes based on comparison of residual information of a macro block of the first format, which is to be transcoded into the macro block in the second format, and residual information of two or more macro blocks of the first format already transcoded for one or more of the previous frames in the sequence of input frames;
(b) determine, for each candidate coding mode in the set of the candidate coding modes, a value of a cost function, characterizing distortion and bitrate for the macro block; and
(c) select a coding mode for the macro block of the second format from among the set of the candidate coding modes, the selected coding mode having the lowest value of the cost function.

The transcoder control sub-system is further configured to determine relative residual information for the macro block of the first format with respect to the residual information of the two or more macro blocks of the first format.

The transcoder control sub-system is further configured to determine the relative residual information as a ratio of a first function of residuals of the macro block of the first format and a second function of residuals of the two or more macro blocks belonging to the same Inter frame as said macro block of the first format.

The transcoder control sub-system is further configured to determine the residual information of the two or more macro blocks of the first format as average relative residual information over a combination of input and output coding modes.

The system further comprises a motion vector control module, limiting the set candidate coding modes based on comparison between motion vectors for the macro block in the first format and predicted motion vectors for the macro block in the second format.

The motion vector control module is also configured to refine motions vectors for the candidate coding modes except those where a coding mode for the macro block in the first format is the same as a coding mode for the macro block in the second format, and where residual information of the macro block of the first format does not exceed a threshold associated with average relative residual information of two or more macro blocks of the first format already transcoded for one of the previous frames in the sequence of input frames, the macro block in the first format and the two or more macro blocks of the first format being coded in the same coding mode.

In an embodiment of the system described above, the threshold is equal to one of the following:
the average relative residual information of the two or more macro blocks; or
a fraction of the average relative residual information of the two or more macro blocks.

In an embodiment of the system described above, the first format is MPEG-4 and the second format is H.264.

In an embodiment of the system described above, the cost function is a Lagrangian Cost Computation function.

In the system described above, the threshold is an adjusted average sum of absolute values for the residual (ASAR) information of two or more macro blocks of the first format already transcoded for one of the previous frames in the sequence of input Inter frames, the macro block in the first format and the two or more macro blocks of the first format being coded in the same coding mode.

According to yet one aspect of the invention, there is provided a system for improving efficiency in transcoding a video sequence comprised of input Inter frames, each input Inter frame comprising one or more input macro blocks of pixels encoded in a first format, into a sequence of output Inter frames, each output Inter frame comprising one or more output macro blocks of pixels encoded in a second format, the system comprising:
a processor; and
non-transitory computer readable storage medium having computer readable instructions stored thereon for execution by the processor, causing the processor to:
(a) determine a set of candidate coding modes for a macro block of the second format depending on coding modes used for coding macro blocks of the first format, comprising limiting the set of candidate coding modes based on comparison of residual information of a macro block of the first format, which is to be transcoded into the macro block in the second format, and residual information of two or more macro blocks of the first format already transcoded for one of the previous frames in the sequence of input Inter frames;
(b) determine, for each candidate coding mode in the set of the candidate coding modes, a value of a cost function, characterizing distortion and bitrate for the macro block; and
(c) select a coding mode for the macro block of the second format from among the set of the candidate coding modes, the selected coding mode having the lowest value of the cost function.

Thus, the improved method and system for efficient transcoding of video using coding modes, motion vectors and residual information have been provided.

BRIEF DESCRIPTION OF THE DRAWINGS

Embodiments of the invention will now be described, by way of example, with reference to the accompanying drawings in which:

FIG. 2 shows a Table 210 and a Table 220 as examples of mode conversion tables;

FIG. 13 shows two tables 10 and 1320, listing statistics of frequency distribution of output H.264 CMs corresponding to each case of MPEG-4 inter16×16 input CM according to an embodiment of the invention;

FIG. 18A shows results table 1805 for CIF videos "Bus", "Crew", "Football", "Foreman", "Highway", and "M. Daughter" for bitrates of 32 kbs, 128 kbs, and 192 kbs;

FIG. 18B shows results table 1810 for QCIF videos "Carphone", "Claire", "Foreman", "Hall", "Miss-America", and "Suzie" for bitrates of 128 kbs, 512 kbs, and 768 kbs;

FIG. 18C shows results table 1815 for 4CIF, 704×576 videos "City", "Crew", "Ice", and "Soccer" for bitrates of 1.02 Mbs, 2.04 Mbs, and 3.02 Mbs, as well as results table 1820 for HD 1920×1080 videos "Pedestrian-area", "Sunflower", and "Tractor" for bitrates of 5.2 Mbs, 10.5 Mbs, and 15.7 Mbs.

DETAILED DESCRIPTION OF THE EMBODIMENTS OF THE INVENTION

This patent application presents a highly efficient algorithm for MPEG-4 to H.264 transcoding. Block coding modes, motion vectors and residual information are extracted from the incoming MPEG-4 bitstream and judiciously reused in the H.264 encoding process to significantly reduce its computational complexity, while preserving good visual quality.

Brief Recapitulation of the Previous Proposal by the Inventors

In an earlier paper "Efficient MPEG-4 to H.264 transcoding exploiting MPEG-4 block modes, motion vectors, and residuals," presented by I. Metoevi and S. Coulombe at *ISCIT* (*International Symposium on Communications and Information Technologies*), Incheon, South Korea, September 2009, which is also described in the U.S. patent application Ser. No. 12/633,050 filed on Dec. 8, 2009 cited above, the inventors of the present invention had proposed to exploit the decoded residual information, in addition to the block modes and MV information gathered from the MPEG-4 decoding stage, to further improve efficiency in terms of speed and quality.

Figure 1:
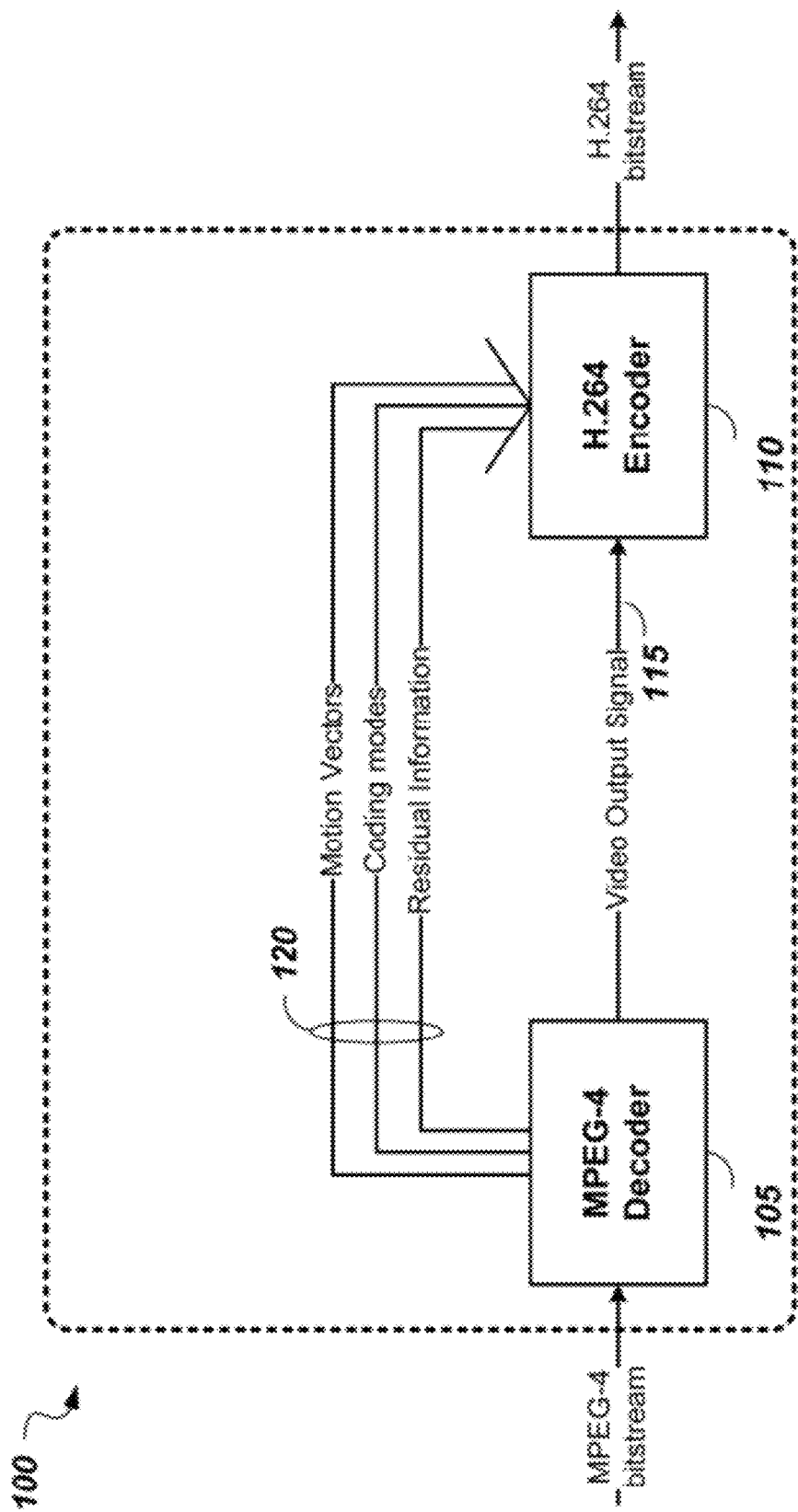
FIG. 1 illustrates an MPEG-4 to H.264 transcoder system 100 of the parent U.S. patent application Ser. No. 12/633,050 filed on Dec. 08, 2009, which has now issued into a U.S. Pat. No. 8,494,056 on Jul. 23, 2013, including: an MPEG-4 Decoder 105 and an H.264 Encoder 110.

FIG. 1 schematically shows a MPEG-4 to H.264 transcoder system 100 of the above noted patent application Ser. No. 12/633,050, including: an MPEG-4 Decoder 105 and an H.264 Encoder 110.

The transcoder system 100 illustrates a cascaded architecture in which the MPEG-4 Decoder 105, having received and decoded an MPEG-4 bitstream, produces a video output signal 115, which is connected to an input of the H.264 Encoder 110 which in turn produces an H.264 bitstream. The MPEG-4 to H.264 transcoder system 100 represents a fast MPEG-4 to H.264 transcoder architecture, providing efficiency and speed by reusing MPEG-4 block modes, motion vectors, and residual information, collectively referred to as a MPEG-4 meta data set 120. The MPEG-4 meta data set 120 is gathered by from the MPEG-4 Decoder 105 and forwarded to the H.264 Encoder 110. The transcoding process is thereby speed up compared to a simple cascading of decoder and encoder.

A full description of the MPEG-4 to H.264 transcoder system 100 may be found in the U.S. parent patent application Ser. No. 12/633,050 cited above.

The algorithm used in the MPEG-4 to H.264 transcoder system 100 proceeds in two main steps. First, the number of H.264 candidate block modes is reduced, based on the decoded MPEG-4 block modes, but enriched with the residual and MV information. Thereby, one can further divide macroblocks (MBs) into classes containing fewer candidate block modes to evaluate. Secondly, MVs are reused and refined only if they are deemed to be inefficient, based on the residual information. This method already gives good results: a 0.5 dB quality degradation for speedups of a factor of 4.5, on average.

However, it has been noticed by the inventors of the present application that the earlier method described in Ser. No. 12/633,050 application uses fixed thresholds in the MB classification and MV refinement process, and as a consequence, it can be further improved for all bit rates and video characteristics. In particular, the method can be improved for high bit rates as for medium to low bit rates, and for low motion videos.

In the present invention to be described in detail below, we are proposing a new and improved algorithm for MPEG-4 to H.264 transcoding including advanced methods of exploiting the information contained in the meta data 120, thereby gaining further improvements over our earlier algorithm described above.

In the new improved algorithm, conveniently, a measure of the decoded residual information is used, for example, the relative sum of absolute residuals, to provide adaptivity to the bit rate and the video characteristics. Further, we propose a conditional use of smaller partitions for better quality at high bit rates, while maintaining good speedups. In addition, we take advantage of the correlation between successive frames, by collecting statistics during the transcoding of a frame and using them in the transcoding of the next frame, or some of the following frames, by establishing adaptive thresholds to the bit rate and video characteristics.

Several innovative techniques are disclosed which are designed to improve the efficiency of video transcoding in general, and will be described and evaluated for transcoding from MPEG-4 to H.264 specifically. Although the techniques described in this application are designed for improving the efficiency of transcoding from MPEG-4 to H.264 that affect only the coding of inter frames, while transcoding of intra frames is not affected, it is also understood that principles of the present invention can be also applied to transcoding between other video formats.

The present application provides a number of improvements, comprising:

exploiting the residual information, in addition to motion vectors and coding block modes, for example from the MPEG-4 decoder stage in the H.264 encoder stage, to speed up the transcoding process in an adaptive manner;

exploiting a relative residual measure to provide adaptivity to bitrate and video characteristics, by combining the relative residual measure with block mode decisions and motion vectors from MPEG-4 to restrict the number of block modes to be considered in the H.264 encoding;

conditionally using small partitions in the H.264 CM candidates to obtain good video quality at a high bitrate and still maintaining good speed ups;

making thresholds adaptive to bitrate and video characteristics, thus obtaining consistent results; and exploiting correlation between successive frames by using statistics of the relative residual measure of previous frames for defining thresholds.

In the next section, some details are presented regarding the working principles of the MPEG-4 to H.264 transcoding approach exploiting the frequency distribution of coding modes correspondence, on which the proposed method and system based. Following this, the effect of video characteristics and bit rates on the determination of H.264 coding modes is analyzed, and the main concepts used in the proposed method are presented. In subsequent sections, a novel coding modes determination algorithm and a novel MV determination algorithm are presented. In conclusion, experimental results are presented.

MPEG-4 to H.264 Transcoding Exploiting Frequency Distribution of Coding Modes Correspondence One of the objectives of the present method is to reduce the list of candidate coding modes (CMs) to be tested in order to reduce the computational complexity of encoding inter frames accordingly.

In Y. K. Lee, S. S. Lee and Y. L. Lee, "MPEG-4 to H.264 Transcoding using Macroblock Statistics," *IEEE International Conference on Multimedia and Expo*, pp. 57-60, July 2006, cited above, the authors exploit the frequency distribution of the H.264 block modes corresponding to each MPEG-4 block mode in order to derive an MPEG-4 to H.264 block mode conversion table.

FIG. 2 shows a Table 210 and a Table 220 as examples of mode conversion tables. Table 210 shows statistics that were gathered for several QCIF videos at a bit rate of 32 kbps using an H.264 encoder implemented with software that is available for download from the Intel corporation (Intel's codec). Table 220 shows another table, gathered for several QCIF videos at a bit rate of 160 kbps, also using Intel's codec.

Both, Table 210 and Table 220 illustrate statistics from QCIF videos, initially encoded at 200 kbps in MPEG-4, and transcoded, using the cascade approach, to H.264 at the lower bitrate, 32 kbps and 160 kbs respectively.

In each of the Tables 210 and 220 the values under submodes in the last four columns are the mapping percentages of the sub-blocks with respect to the Inter 8×8 mode. In their method, Y. K. Lee et al. ignore statistically infrequent (unlikely) CMs in order to reduce complexity.

According to embodiments of the present invention, the list of candidate CMs is further reduced by more precisely classifying the MBs. To that end, we improve on the idea proposed in our earlier paper and parent patent application Ser. No. 12/633,050 (see reference above) to exploit the fact that the number of partitions used to encode a MB increases with its residual energy. Indeed, complex regions have higher residual energy and are likely to be coded into smaller partitions, which incidentally, are not considered for MBs with low residual energy. In our earlier paper and parent patent application Ser. No. 12/633,050 (see reference above), residual energy was compared against a threshold to decide whether a MB had low or high complexity. However, this threshold did not take into account the video characteristics or the specific target H.264 bit rate, which, due to the rate-distortion optimization (RDO) process, affect the CM determination. In the next two sub-sections, the effects of video characteristics and bit rates on the average residual associated with each coding mode are analyzed. Then it will be shown that to improve the transcoding efficiency, it is necessary to consider the video characteristic and the bit rate.

Analysis of the Effect of Video Characteristics on the Average Sum of Absolute Residuals Associated with Coding Modes The residual energy is globally higher for complex motion videos than for simple motion videos. To maximize the quality, rate control algorithms allocate fewer bits to MBs comprised within stationary regions or having small and simple motion, compared to regions having complex motion. Therefore, simple MBs tend to be coded using large partitions while smaller partitions are used to code complex MBs. However, the notion of complex motion is relative. If the frame has a high number of complex MBs, the bit budget for these types of MBs will be tighter, and therefore, some may still be encoded into large partitions. Conversely, when these MBs are more complex than other MBs in a frame, the simple motion MBs may be coded into small partitions. The rate control algorithm proposed in an article from study group 16 of the International Telecommunication Union (ITU) (ITU-T/SG16, "Video codec test model, Test Model Near-Term Version 8 [TMN8]," Portland, June 1997), for example, uses the variance to determine the MB relative complexity and to perform bit allocation.

We will now present some definitions here before illustrating the influence of the video characteristics on the CM.

Let $R_n$ be the sum of absolute residuals (SAR) of the MB n of a frame defined as follows:

$$R_n = \sum_{i=0}^{15} \sum_{j=0}^{15} |R_n(i, j)| \tag{1}$$

with $R_n$ (i, j) being the residual pixel value of the MB n at position (i, j). We will often refer to $R_n$ as the absolute residual of MB n. Let us also define the following notations:

icm: the incoming (input) CM (an MPEG-4 CM).

ocm: the outgoing (output) CM (an H.264 CM).

$S_{icm}^{ocm}$: the set of all MB numbers in the frame coded using icm mode in MPEG-4 and transcoded using ocm mode in H.264.

$|S_{icm}^{ocm}|=\text{card}(S_{icm}^{ocm})$: the number of elements in the set $S_{icm}^{ocm}$.

For both icm and ocm, we will use the partition size to denote the inter modes (e.g. 16×16 or 8×8 refer to Inter16×16 and Inter8×8 respectively). Let us also define the average sum of absolute residuals (ASAR) over all MBs of a frame transcoded from icm to ocm as follows:

$$\mu_{icm,R}^{ocm} = \frac{1}{|S_{icm}^{ocm}|} \sum_{n \in S_{icm}^{ocm}} R_n \tag{2}$$

Figure 3:
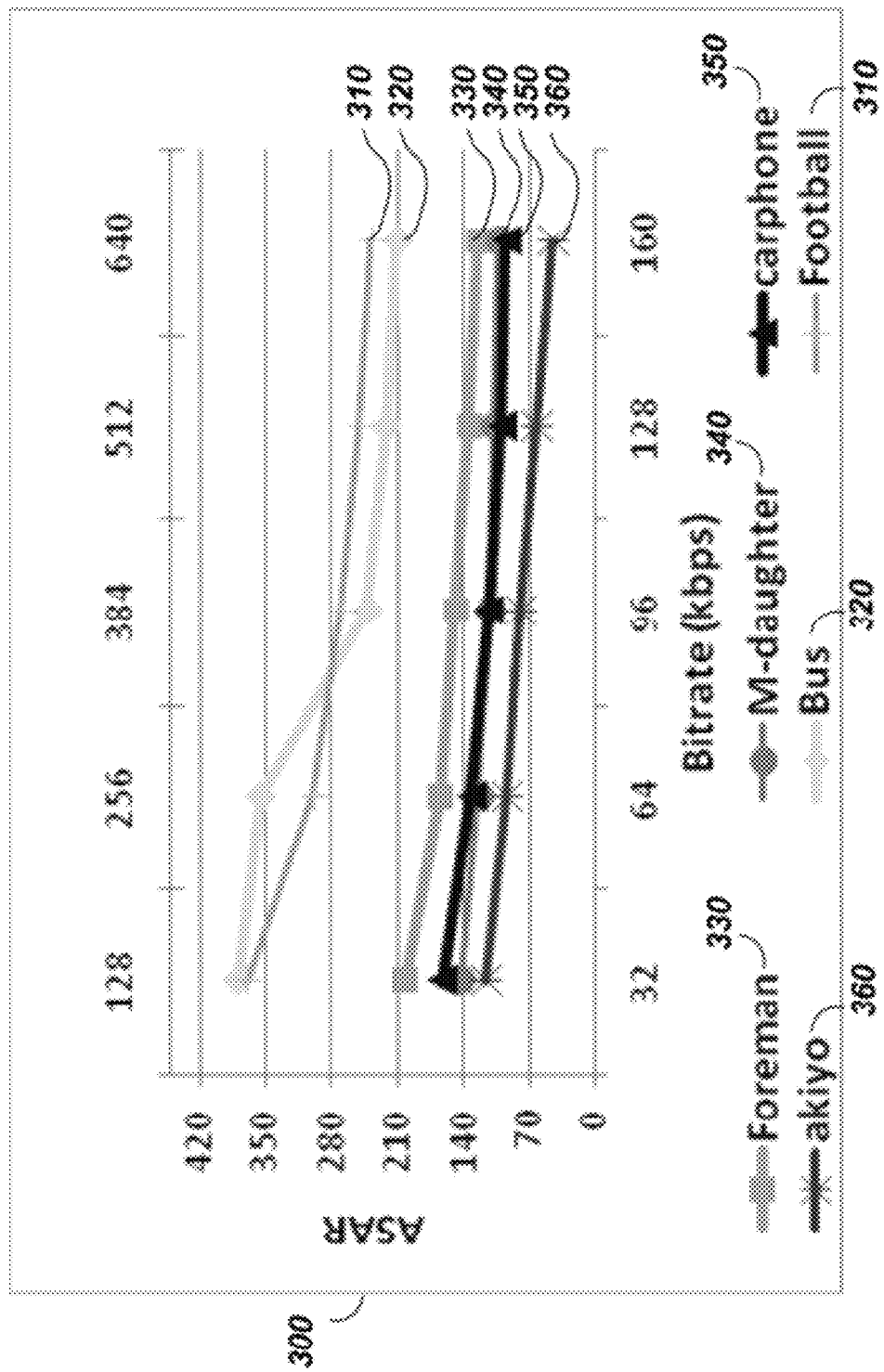
FIG. 3 shows a graphic 300 plotting ASAR over the MBs that were coded Inter16×16 in MPEG-4 and transformed into H.264 in Skip CM ($\mu_{16\times16}^{Skip}$,R), as a function of the bit rate for different QCIF and CIF videos.
Figure 4:
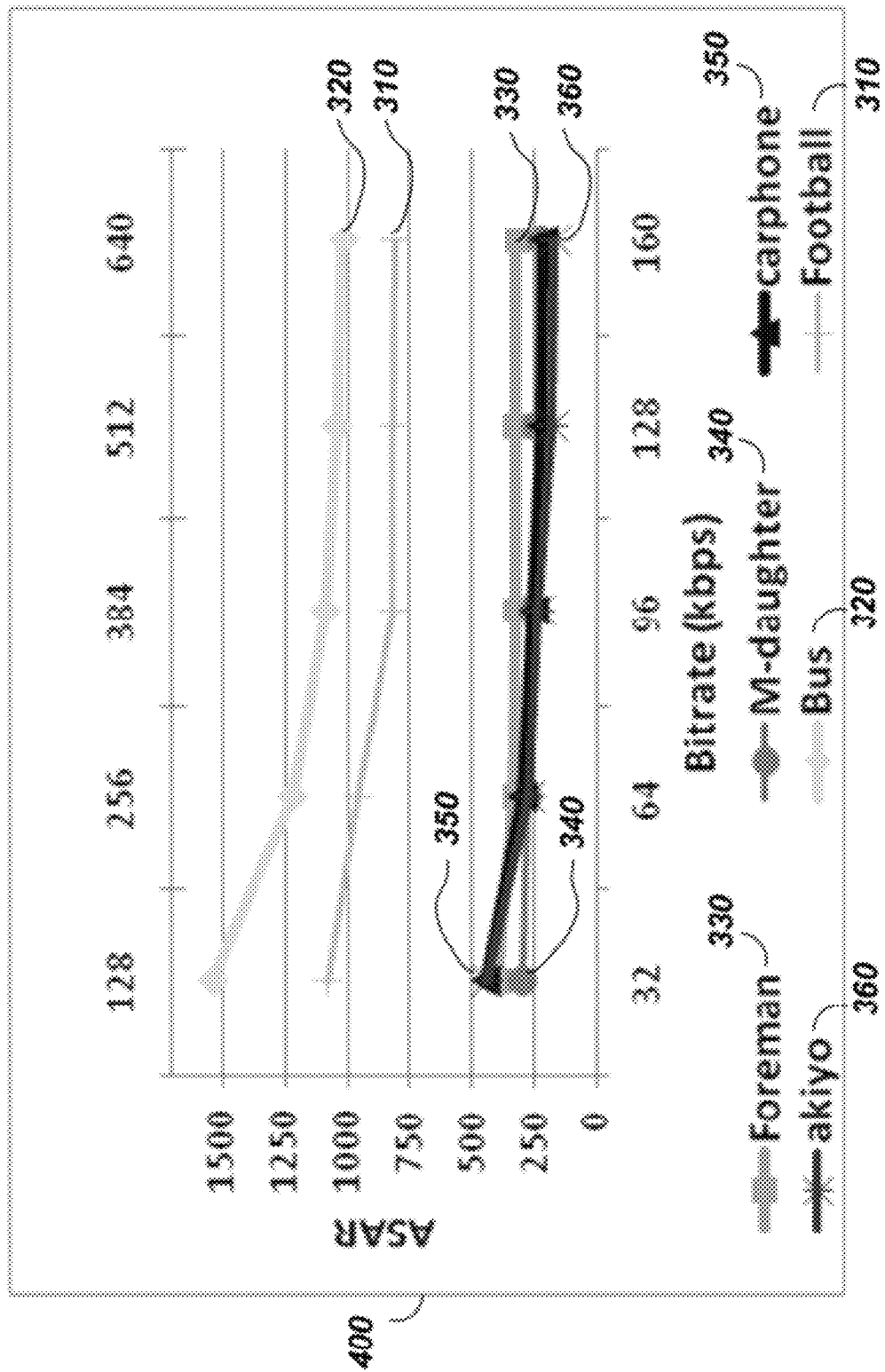
FIG. 4 shows a graphic 400 plotting ASAR over the MBs that were coded Inter16×16 in MPEG-4 and transformed into H.264 in Inter CM ($\mu_{16\times16}^{16\times16}$,R)

FIGS. 3 and 4 illustrate the influence of video characteristics on the average sum of absolute residuals (ASARs), $\mu_{16\times16}^{Skip}$, R and $\mu_{16\times16}^{16\times16}$, R for a number of video streams at different bit rates. These are the results of an analysis on which the innovative concepts of the invention are partially based.

FIG. 3 shows a graphic 300 plotting ASAR over the MBs that were coded Inter16×16 in MPEG-4 and transformed into H.264 in Skip CM ($\mu_{16\times16}^{Skip}$,R), as a function of the bit rate for different QCIF and CIF videos. Similarly, FIG. 4 shows a graphic 400 plotting ASAR over the MBs that were coded Inter16×16 in MPEG-4 and transformed into H.264 in Inter CM ($\mu_{16\times16}^{16\times16}$,R).

For the analysis, the results were obtained for a cascade transcoding of frame number 68 of each of the following videos which are available from a document cited in the information disclosure statement for this application:

"Football" (310)(CIF), "Bus" (320)(CIF), "Foreman" (330)(QCIF), "M-daughter" (340)(CIF), "Carphone" (350) (QCIF), and "Akiyo" (360)(QCIF).

In both, FIGS. 3 and 4, the bitrate values shown along the bottom axis (32, 64, 96, 128, and 160 kbps) correspond to QCIF videos, while the bitrate values shown along the top axis (128, 256, 384, 512, and 640 kbps) are for CIF videos. The results of both CIF videos and QCIF videos were merged on the same graphic. If the videos are QCIF, the bottom axis shows which rate was used for encoding in H.264. If the videos are CIF, the top axis applies. One may observe that ASAR doesn't depend on the resolution (since it is averaged by pixels) but rather on the amount of motion, and other characteristics specific to each video sequence.

From these graphs, it can be seen that the ASARs can vary significantly, depending on the video and tend to increase with the video complexity (values for the more complex Bus 320, Football 310, and Foreman 330 videos are consistently higher than those for Akiyo 360). For best performance, the CM classification thresholds should take into account the video characteristics.

Analysis of the Effect of the Bit Rate on the Average Sum of Absolute Residuals Associated with Coding Modes An H.264 CM is selected for each macro block of the frame, for example as the result of an RDO process, according to "Text Description of Joint Model Reference Encoding Methods and Decoding Concealment Methods," by K.P. Lim, G. Sullivan and T. Wiegand, Joint Video Team Document JVT-O079, April 2005. The optimal CMs can be significantly different from one bit rate to another. Indeed, the cost of small partitions and of MVs becomes relatively higher as the bit rate decreases, which explains why larger partitions are preferred for lower bit rates. As can be seen in FIGS. 3 and 4, ASAR values for $\mu_{16\times16}^{Skip}$, R and $\mu_{16\times16}^{16\times16}$, R are higher at lower rates. We see that initially, there is a significant drop in the ASAR value as we increase the rate, but then it saturates. For best performance, the CM classification thresholds should take the bit rate into account.

Relative Sum of Absolute MPEG-4 Residuals

As explained above, individual MB complexity is relative compared to the overall average of all MB's residuals. In view of this fact, we propose a relative measure of the absolute residual for an accurate classification of the individual MBs.

We propose to use the MPEG-4 SAR of a MB relative to the average SAR of all MBs within a frame, as a complexity measure to classify MBs. This measure will represent the relative MB complexity compared to other MBs within the frame. As we will show, this measure of the relative complexity will lead to a better classification of the MBs compared to the use of the residual energy and fixed thresholds as in our earlier paper (see above). Let us define $\mu_G$, the ASAR over the whole frame, and $R_{n/G}$, the relative SAR (RSAR) of MB n with respect to the frame, as follows:

$$\mu_G = \frac{1}{N_{MB}} \sum_{n=0}^{N_{MB}-1} R_n \qquad (3)$$

$$R_{n/G} = \sum_{i=0}^{15} \sum_{j=0}^{15} \frac{|R_n(i,j)|}{\mu_G + \varepsilon} = \frac{R_n}{\mu_G + \varepsilon} \qquad (4)$$

where $N_{MB}$ is the number of MBs in the frame, and $\varepsilon$ is a regularization term (a small positive value to avoid division by 0; in our simulation, it was fixed to $10^{-10}$). As mentioned, the RSAR $R_{n/G}$ measure represents the relative complexity of a MB compared to the other MBs within the frame (i.e. we compare the SAR of a MB in a frame with the average SAR of all the MB in that frame). We also define $R_{(n,k)/G}$, the RSAR of a block k, within MB n, with respect to the frame as follows:

$$R_{(n,k)/G} = 4 \sum_{i=0}^{7} \sum_{j=0}^{7} \frac{|R_n(i+p_{kx}, j+p_{ky})|}{\mu_G + \varepsilon} \qquad (5)$$

with $p_k=[p_{kx}, p_{ky}]$ for $0 \le k \le 3$ where $p_0=[0,0]$, $p_1=[8,0]$, $p_2=[0,8]$, and $p_3=[8,8]$.

Clearly, $R_{n/G}$ can be expressed as the sum of $R_{(n,k)/G}$ on the 4 blocks of a MB as, $$R_{n/G} = \frac{1}{4} \sum_{k=0}^{3} R_{(n,k)/G}.$$

As one of our goals is to reduce computational complexity, the computation of $R_{n/G}$ will be executed, for example, using half of the pixels by performing a horizontal subsampling by a factor of 2. It is understood that generally a certain predetermined fraction of all pixels that is less than all pixels can be used for subsampling.

Subsampling may also performed in other patterns, for example vertically or in a checkerboard fashion and by larger factors than 2. Our experiments have shown that subsampling in this way does not significantly affect the quality results, but higher factors could affect quality negatively.

Figure 5:
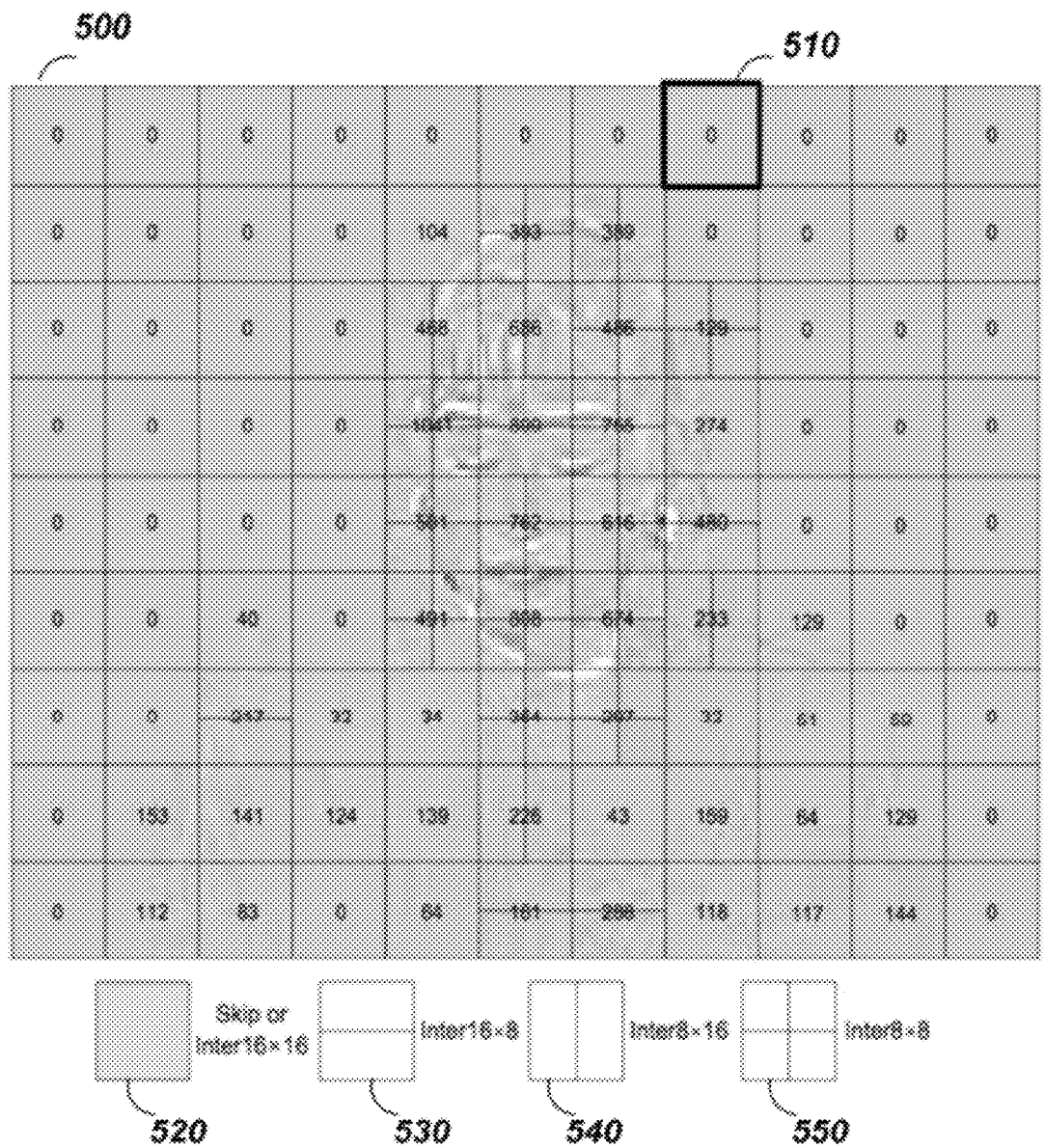
FIG. 5 shows a diagram 500 illustrating a frame of the QCIF Akiyo video, divided into MPEG-4 MBs 510 indicating selected H.264 CMs for that MB.

With the proposed measure $R'_{n/G}$, MBs for which the MPEG-4 absolute residual is high compared to the frame average will be considered complex. In FIG. 5, we can see that there is a link between $R_{n/G}$ and the CM. Regions with high contrast areas have the highest $R_{n/G}$ and tend to be encoded into smaller partitions. Our assumption about the relationship between $R_{n/G}$ and the CM seems to be verified. For example, a macro block 550 in the center of the picture in FIG. 5 having a value 762 indicated inside the macro block is broken up into 4 partitions of 8×8 macro blocks (550) whereas any macro block having the value of 0 remains a large 16×16 macro block (520). However, to affirm this with certainty, we performed an Analysis Of VAriance (ANOVA), a procedure described in "Analysis of variance in complex experimental designs" by H.R. Lindman, W.H. Freeman & Co. Hillsdale, NJ USA, 1974, to measure the influence of each variable (MPEG-4 incoming CM, $R_{n/G}$) on the choice of H.264 CM as well as the interaction between the variables. To that end, we established a threshold of rejection F at 0.05 and calculated P, the probability that our hypothesis is true (i.e. the hypothesis that there is no relationship between $R_{n/G}$ and the chosen H.264 CM). If p <F, we can reject the null hypothesis. ANOVA was performed for different videos (Akiyo, Claire, Foreman, etc.) at various bit rates in order to prove the relationship between $R_{n/G}$ and the H.264 CM, and the results were conclusive. We obtained P=0 for all cases, proving that indeed the H.264 CM depends strongly on $R_{n/G}$.

To reduce size of the set of CMs to test, we will use a threshold to classify MBs according their $R_{n/G}$. However, as mentioned earlier, fixed thresholds as proposed in our earlier paper may be problematic, and we should preferably adjust them according to video characteristics and the bit rate, as explained in the next sub-section.

FIG. 5 shows a diagram 500 illustrating a frame of the QCIF Akiyo video, divided into MPEG-4 MBs 510 indicating selected H.264 CMs for that MB, each selected H.264 CM chosen according to the RSAR $R_{n/G}$ of the corresponding MB 510, relative to a fixed threshold.

The type of H.264 CM selected for each of the MBs 510 is drawn as a block either: without a dividing line, meaning a "Skip"/"Inter16×16" block (520); with a horizontal dividing line, meaning a pair of "Inter16×8" blocks (530); with a vertical dividing line, meaning a pair of "Inter8×16" blocks (540); or with both horizontal and vertical dividing lines, meaning a set of four of "Inter8×8" blocks (550). The numerical value shown inside each MB represents the RSAR $R_{n/G}$ for that MB.

Adaptive Thresholds Based on Statistics of Successive Frames

Because successive frames are usually highly temporally correlated, it is therefore likely that the characteristics of a frame (such as CM, motion complexity and directionality, and quantization parameter) will be similar from one frame to the next, meaning that the statistics gathered during the transcoding of one frame could therefore be exploited in the transcoding of the next. We will show the benefits of exploiting this temporal correlation to improve the classification of our MBs and MV refinement thresholds (i.e., thresholds for which MVs will be refined instead of being reused without modification). Let us define the main statistics that will be considered in the proposed system:

$S_{icm}^{ocm,t}$: the set of all MB numbers, in frame t, coded using icm mode in MPEG-4 and transcoded using ocm mode in H.264.

$R_{n/G}^{t}$: the relative SAR, or RSAR, of an MB n in frame t.

$\mu_{icm,R/G}^{ocm,t}$: the average of $R_{n/G}^{t}$ over all MB n ∈ $S_{icm}^{ocm,t}$ in frame t; also referred to as the average relative SAR (ARSAR). $\mu_{icm,R/G}^{ocm,t}$ represents the average RSAR of all the MBs in a frame which went through the same coding mode mapping (from incoming coding mode icm to outgoing coding mode ocm) and is computed as shown in equation (6).

$$\mu_{icm,R/G}^{ocm,t} = \frac{1}{|S_{icm}^{ocm,t}|} \sum_{n \in S_{icm}^{ocm,t}} R_{n/G}^{t} \qquad (6)$$

We propose to collect statistics on $R_{n/G}^{t}$, for all MBs ∈ $S_{icm}^{ocm,t}$, during the transcoding of frame t. More specifically, for each combination of MPEG-4 incoming mode icm and H.264 outgoing mode ocm, we compute the average of $R_{n/G}^{t}$ over all MB n ∈ $S_{icm}^{ocm,t}$. We assume that a received MB of a frame at time t with an MPEG-4 icm and a $R_{n/G}^{t}$ near $\mu_{icm,R/G}^{ocm,t-1}$ has a high probability of being transcoded using ocm in H.264, and our adaptive thresholds will be based on that assumption. We will show that it results in a highly efficient transcoding system.

The $\mu_{icm,R/G}^{ocm,t-1}$ are calculated during the effective transcoding of a frame t−1 and used to set classification thresholds for the frame t, for all inter frames following each intra frame except the first inter frame. We will show that using $\mu_{icm,R/G}^{ocm,t-1}$ as classification parameters has the advantage of allowing adaptation to the bit rate and video characteristics.

Coding Modes Determination Algorithm

In this section, we present a CM determination algorithm based on RSAR $R_{n/G}^{t}$ and $\mu_{icm,R/G}^{ocm,t}$ for the various incoming CMs. To improve the visual quality resulting from the algorithm proposed in our earlier paper for all bit rates, especially at medium to high bit rates, smaller partitions are now considered for the incoming Inter 16×16 MPEG-4 CM. Still, low computational complexity is maintained through a finer classification of the MBs. For each class, we propose a set of candidate CMs carefully designed to avoid testing CMs which would only increase computational complexity without significantly improving the visual quality. For instance, we can see in Table I (FIG. 2) that PCM and sub-modes (8×4, 4×8 and 4×4) rarely appear regardless of the H.264 encoding bit rate. Therefore, they will not be considered as candidates. The following sub-sections detail the CM determination according to each incoming MPEG-4 CM. For each case, we will denote the set of H.264 candidate CMs associated with an incoming MPEG-4 CM icm as $CCM_{icm}^{H.264}$.

CM Determination for an Incoming Intra MPEG-4 MB

In the case of an incoming Intra MPEG-4 MB, we use only the H.264 CM frequency distribution property. As can be seen in Table I, MBs tend to be re-encoded into Intra 4×4 and Intra 16×16 (64.2%, 26.1% at 32 kbps and 73.8%, 21.6% at 160 kbps), with the other CMs being rare. Thus, the set of H.264 candidate CMs will be $CCM_{Intra}^{H.264}$={Intra16×16, Intra4×4}.

To dispel any confusion that may arise from the use of the terms "intra" and "inter", it is noted that the description is only concerned with inter frames in which macroblocks may be coded with any of various coding modes, one of which is an intra coding mode.

CM Determination for an Incoming Skip MPEG-4 MB

The fact that the MB was coded as Skip in MPEG-4 indicates that the MV was close to (0,0), and the residual energy low. Indeed, in MPEG-4, MV=(0,0) and no transmitted residuals are implicitly associated with the Skip mode. Pixels from the reference frame located at the same spatial position as the MB to encode are simply copied, and as a result, only large H.264 partitions such as Skip or Inter16×16 should be considered for this CM. Table I confirms that fact by showing that Skip MBs are highly likely to be transcoded into Skip and Inter16×16. However, in H.264, the MV implicitly associated with the Skip mode is the predicted MV, which we denote $v_p$. An MB will therefore be encoded using Skip mode if it has a low residual energy and an MV similar to its neighbors' (close to $v_p$). Since the Skip MV=(0,0) in MPEG-4, the MB will be coded using Skip in H.264 only if $v_p$ is close to zero. Otherwise, Inter16×16 will be used. Consequently, the proposed set of candidate CMs for an incoming Skip MPEG-4 MB is:

$$CCM_{Skip}^{H.264} = \left\{ \begin{array}{ll} \text{Skip} & \text{if } |v_p| \leq 1, \\ \text{inter}16 \times 16 & \text{if } |v_p| > 1 \end{array} \right\}$$

where $|v_p| \leq 1$ means that $|v_{px}| \leq 1$ and $|v_{py}| \leq 1$, with $v_p = (v_{px}, v_{py})$.

CM Determination for an Incoming Inter16×16 MPEG-4 MB

In the case of an incoming Inter16×16 MB, we propose to classify the MBs into three cases according to their complexity (low, medium and high) for an efficient determination of CM candidates. In addition, for this classification, we use automatic thresholds based on ARSARs $\mu_{16 \times 16, R/G}^{Skip, t-1}$ and $\mu_{16 \times 16, R/G}^{16 \times 16, t-1}$ collected during the previously transcoded frame.

Let t be the current frame number to transcode, with $t \in [0, T]$ where T is the total number of frames in the video sequence. Let $T_r$ be the key frame spacing (number of frames between two intra frames). For intra frames, $[t \bmod T_r]=0$; for frames immediately following an intra frame, $[t \bmod T_r]=1$, and for other frames $[t \bmod T_r]>1$. For the frames immediately following an intra frame, defined as Inter16×16 case 0, the candidate CM set is expanded in order to obtain reliable statistical data. Therefore, for $[t \bmod T_r]=1$, we set $CCM_{16 \times 16}^{H.264} = \{\text{Intra}16\times16, \text{Skip}, \text{Inter}16\times16, \text{Inter}16\times8, \text{Inter}8\times16, \text{Inter}8\times8\}$. We deliberately ignore the Intra4×4 CM in this case, as the MBs were coded using large Inter16×16 partitions in MPEG-4, Intra4×4 rarely appear, and we already considered Intra16×16 as a candidate CM.

For $[t \bmod T_r]>1$, we classify the MBs into three cases, Inter16×16 case I to Inter16×16 case III, as follows:

Inter16×16 case I. As can be seen in the Tables 210 and 220 of FIG. 2, a significant proportion of Inter16×16 MBs are re-encoded using Skip mode. This is due to the fact that, as we previously discussed, H.264 does not have the same definition of Skip as MPEG-4. An MB which follows the same motion as its neighbors may be encoded using Skip mode if its residual energy is low enough. We propose to group, in a set, MBs likely to be encoded using Skip mode; that is, those with rather low $R_{n/G}^t$ and an incoming MPEG-4 MV, denoted $v_{mp4}$, similar to the H.264 predictor $v_p$. Therefore, we first classify as Inter16×16 case I, with associated $CCM_{16 \times 16}^{H.264} = \{\text{Skip}\}$, the MBs satisfying the following condition:

$$R_{n/G}^t \leq \alpha_{16 \times 16}^{Skip} \cdot \mu_{16 \times 16, R/G}^{Skip, t-1} \text{ and } |v_{mp4} - v_p| \leq 1 \quad (7)$$

where $\alpha_{16 \times 16}^{Skip}$ is an adjustment coefficient controlling the quality/speedup (Q/S) tradeoff. In general, $\alpha_{icm}^{ocm}$ is an adjustment coefficient controlling the Q/S tradeoff associated with $\mu_{icm, R/G}^{ocm, t-1}$. By $|v_{mp4} - v_p| \leq 1$, we mean that $|v_{mp4x} - v_{px}| \leq 1$ and $|v_{mp4y} - v_{py}| \leq 1$, with $v_{mp4} = (v_{mp4x}, v_{mp4y})$.

Inter16×16 case II. We propose to include, in this set, MBs with low to medium complexity motion or texture. Since such MBs are likely to be encoded into large partitions, we therefore ignore small partitions for this set without it having much impact on the quality. The set includes MBs satisfying two sets of conditions. The first includes MBs for which $R_{n/G}^t$ is low, but which follow a motion different from their neighbors (and are therefore excluded from the Inter16×16 case I). The condition is:

$$R_{n/G}^t \leq \alpha_{16 \times 16}^{Skip} \cdot \mu_{16 \times 16, R/G}^{Skip, t-1} \text{ and } |v_{mp4} - v_p| > 1. \quad (8)$$

Since these MBs were coded using Inter16×16 in MPEG-4, no partition smaller than Inter16×16 should be considered. The second condition includes MBs with medium $R_{n/G}^t$, i.e., satisfying:

$$\alpha_{16 \times 16}^{Skip} \cdot \mu_{16 \times 16, R/G}^{Skip, t-1} < R_{n/G}^t \leq \alpha_{16 \times 16}^{16 \times 16} \cdot \mu_{16 \times 16, R/G}^{16 \times 16, t-1}. \quad (9)$$

As the residual is not high, it is beneficial to keep the partition large, i.e., no smaller than 16×16. Therefore, for MBs satisfying these two conditions, we propose $CCM_{16 \times 16}^{H.264} = \{\text{Skip}, \text{Inter}16\times16\}$. We include Skip since it could be selected due to bit rate constraints.

Inter16×16 case III. We propose to include, in this set, MBs with high residual energy (high contrast areas in FIG. 5). As the residual energy is high, the prediction was not good for MPEG-4, so it probably will not be good for H.264 either. Therefore, smaller partitions may lead to better prediction and quality improvement. We propose to consider the following CMs: Inter16×16, Inter16×8, Inter8×16, Inter8×8, Intra16×16. Although Inter16×16 is a large partition, it may be selected due to bit rate constraints. An MB belongs to the Inter16×16 set, case III if the following condition is satisfied:

$$R_{n/G}^t > \alpha_{16 \times 16}^{16 \times 16} \cdot \mu_{16 \times 16, R/G}^{16 \times 16, t-1} \quad (10)$$

However, we can notice in the Tables 210 and 220 that Inter8×8 and intra are rarely selected (1.1% and 3.7% in total for Inter16×16 at 160 kbps). This is not surprising since if Inter8×8 had been the best choice for H.264, it would likely also have been the best choice for MPEG-4 (and MPEG-4 would not have used Inter16×16). Consequently, Inter8×8 and intra will be tested only for very complex MBs (i.e., those with very high residual energy) in order to avoid increasing the complexity without improving the quality. The statistic $\mu_{16 \times 16, R/G}^{8 \times 8, t-1}$ will serve as a threshold to determine whether an MB has very high residual energy. Inter8×8 and Intra 16×16 are tested if conditions C1 and C2, respectively, are satisfied. They are defined as follows:

$$C1: R_{n/G}^t > \alpha_{16 \times 16}^{8 \times 8} \cdot \mu_{16 \times 16, R/G}^{8 \times 8, t-1}. \quad (11)$$

$$C2: R_{n/G}^t > \tilde{\alpha}_{16 \times 16}^{8 \times 8} \cdot \mu_{16 \times 16, R/G}^{8 \times 8, t-1}. \quad (12)$$

Intra4×4 was deliberately ignored because it was almost never selected.

To summarize, for an incoming Inter16×16 MPEG-4 MB, the H.264 CM determination process, for frame t, is performed as follows:

If $[t \bmod T_r]=1$ (a frame following an intra frame), $CCM_{16 \times 16}^{H.264}$ is set to Inter16×16 case 0:
$CCM_{16 \times 16}^{H.264} = \{\text{Intra}16\times16, \text{Skip}, \text{Inter}16\times16, \text{Inter}16\times8, \text{Inter}8\times16, \text{Inter}8\times8\}$, identified as.

If $[t \bmod T_r]>1$ (a frame not following an intra frame), the $CCM_{16 \times 16}^{H.264}$ is set according to one of these cases:

Inter16×16 case I:
If $R_{n/G}^t \leq \alpha_{16 \times 16}^{Skip} \cdot \mu_{16 \times 16, R/G}^{Skip, t-1}$ and $|V_{mp4} - V_p| \leq 1$
$CCM_{16 \times 16}^{H.264} = \{\text{Skip}\}$.

Inter16×16 case II:
If $R_{n/G}^t \leq \alpha_{16 \times 16}^{Skip} \cdot \mu_{16 \times 16, R/G}^{Skip, t-1}$ and $|V_{mp4} - V_p| > 1$, or $\alpha_{16 \times 16}^{Skip} \cdot \mu_{16 \times 16, R/G}^{Skip, t-1} < R_{n/G}^t \leq \alpha_{16 \times 16}^{16 \times 16} \cdot \mu_{16 \times 16, R/G}^{16 \times 16, t-1}$
$CCM_{16 \times 16}^{H.264} = \{\text{Skip}, \text{Inter}16\times16\}$.

Inter16×16 case III:

If $R_{n/G}^t \leq \alpha_{16 \times 16}^{16 \times 16} \cdot \mu_{16 \times 16, R/G}^{16 \times 16, t-1}$, $$CCM_{16 \times 16}^{H.264} = \left\{ \begin{array}{l} \text{Inter}16\times16, \text{Inter}16\times8, \text{Inter}8\times16, \\ \text{Inter}8\times8 \text{ if } C1, \text{Intra}16\times16 \text{ if } C2 \end{array} \right\}.$$

$C1: R_{n/G}^t > \alpha_{16 \times 16}^{16 \times 16} \cdot \mu_{16 \times 16, R/G}^{16 \times 16, t-1}$
$C2: R_{n/G}^t > \tilde{\alpha}_{16 \times 16}^{8 \times 8} \cdot \mu_{16 \times 16, R/G}^{8 \times 8, t-1}$ In our simulations, $\alpha_{16\times16}^{Skip}$, $\alpha_{16\times16}^{16\times16}$, $\alpha_{16\times16}^{8\times8}$, and $\tilde{\alpha}_{16\times16}^{8\times8}$ were set respectively to 0.4, 1.5, 1.5 and 2.5.

CM Determination for an Incoming Inter8×8 MPEG-4 MB

We will now explain and detail the determination process for H.264 CMs to be considered for an incoming Inter8×8 MB.

MPEG-4 has chosen Inter8×8 as the best CM over Skip and Inter16×16. This indicates a region with nonuniform motion. Therefore, Skip and Inter16×16 are chosen to meet the bit rate constraints. We can see this in FIG. 2, where their respective percentages increase with a decreasing bit rate: from 1.0% and 22.8% respectively at 160 kbps (Table 220) to 21.7% and 39.5% respectively at 32 kbps (Table 210). Skip, in particular, should not be considered unless $R_{n/G}^t$ is deemed to be low and the four MPEG-4 MVs are close to the H.264 predictors, i.e., if the following condition C3 is met:

$$C3: R_{n/G}^t < \alpha_{8\times8}^{16\times16} \cdot \mu_{8\times8,R/G}^{16\times16,t-1} \text{ and}$$
$$|v_i - v_{p_i}| \le 1, \forall i \in \{1,2,3,4\} \quad (13)$$

where $v_i$ is the MPEG-4 MV associated with partition i within the Inter8×8 MB and $v_{p_i}$ is the H.264 predictor associated with partition i within the Inter8×8 MB. $\alpha_{8\times8}^{16\times16}$ was set to 0.3 in our simulations.

For the Inter8×8 CM, the bit rate constraint has a significant influence on its selection since it requires the transmission of four MVs (which can make it inefficient at low bit rates). We observe this fact in the Tables 210 and 220 of FIG. 2, where the percentage of appearance drops sharply with a reduction in the bit rate (from 41.6% at 160 kbps to 0.4% at 32 kbps). As for the Skip mode, we propose to consider the Inter8×8 mode only if the residual energy is high enough, i.e., if the following condition C4 is met:

$$C4: R_{n/G}^t > \alpha_{8\times8}^{8\times8} \cdot \mu_{8\times8,R/G}^{8\times8,t-1} \quad (14)$$

where $\mu_{8\times8,R/G}^{8\times8,t-1}$ was set to 0.5 in our simulations.

We propose to always consider Inter16×8 and Inter16×8 since they do not exist in the MPEG-4 standard, and are often selected as shown in the Tables 210 and 220 of FIG. 2. Finally, Inter16×16 should always be tested because its frequency is also significant.

Regarding the intra CM, we can see that its frequency of occurrence is rather small (around 6%). However, it is used to encode complex MBs, and we observed experimentally that ignoring this CM had a negative impact on quality, especially for complex video sequences (such as Football). We therefore propose to test the intra mode only for complex video frames, and to use $\mu_G$, the ASAR, over the whole frame described in equation (3), to determine whether or not the video frame is complex.

Using various CIF/QCIF videos, we observed experimentally that $\mu_G$ tends to be around 70 for low complexity videos, around 450 for medium complexity videos, and around 1100 for high complexity videos. Therefore, we set a threshold Thr for the complexity decision to 500. Furthermore, as we do not want to test the intra CM for every MB of a frame, but only for the most complex ones, we add an additional condition on $R_{n/G}^t$. Therefore, we propose to test intra CM if the following condition C5 is met:

$$C5: R_{n/G}^t > \alpha_{8\times8}^{Intra} \cdot \mu_{8\times8,R/G}^{Intra,t-1} \text{ and } \mu_G > Thr \quad (15)$$

where $\alpha_{8\times8}^{Intra}$ was set to 1.5 in our simulations for convenience.

To summarize, for an incoming Inter8×8 MPEG-4 MB, $CCM_{8\times8}^{H.264}$, for frame t, is set as follows:

Inter8×8 case IV: in the first Inter frame after an Intra frame $$\left\{ \begin{array}{c} Skip, Inter16\times16, Inter16\times8, Inter8\times16, \\ Inter8\times8, Intra16\times16 \end{array} \right\}, \text{ if } [t \bmod T_r] = 1$$

Inter8×8 case V: in all subsequent Inter frames $$\left\{ \begin{array}{c} Skip \text{ if } C3, Inter16\times16, Inter16\times8, Inter8\times16, \\ Inter8\times8 \text{ if } C4, Intra16\times16 \text{ if } C5 \end{array} \right\}, \text{ if } [t \bmod T_r] > 1$$

Figure 6:
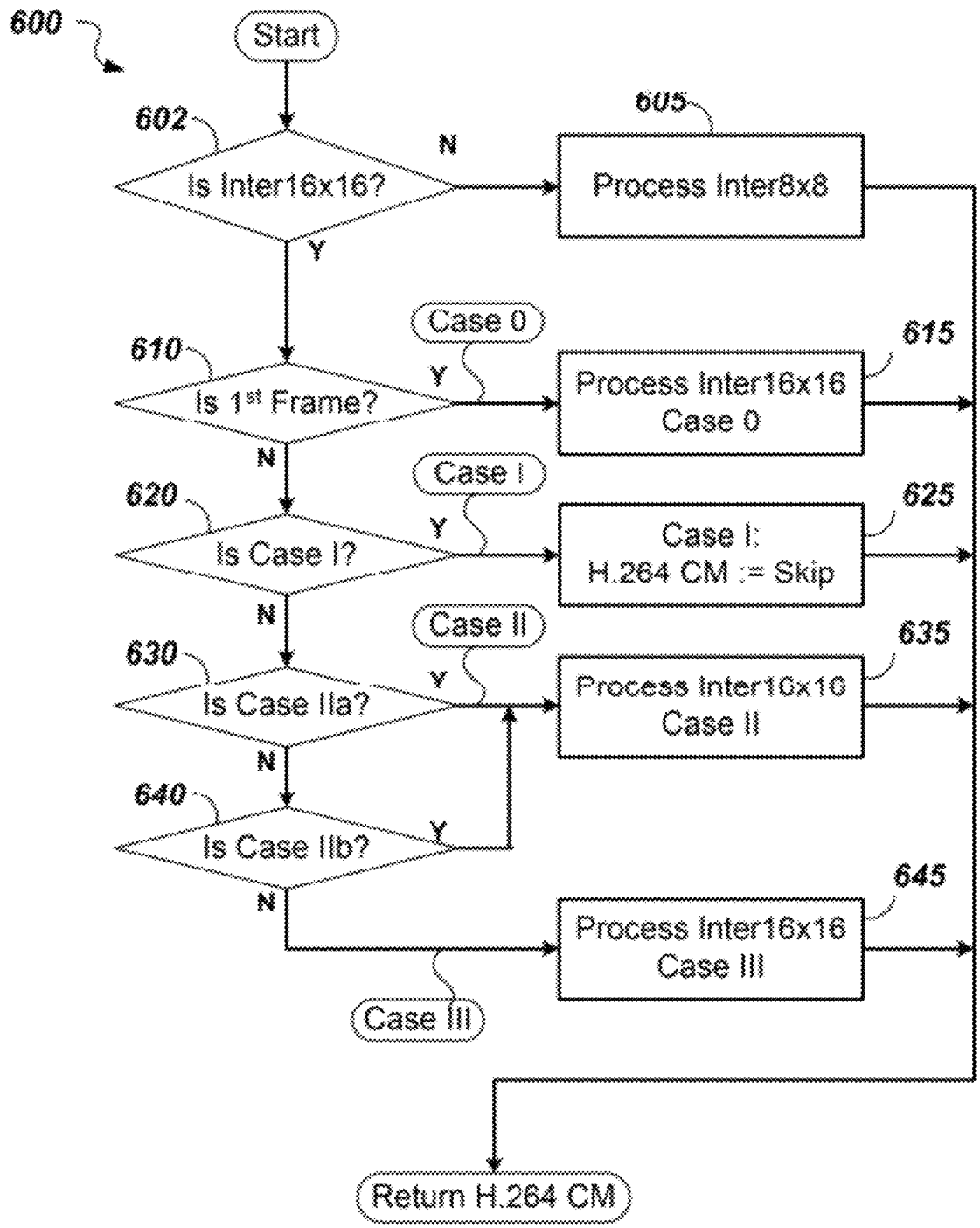
FIG. 6 shows a CM determination method 600 for determining H.264 CMs to be considered for an incoming Inter16×16 MPEG-4 MB or Inter8×8 MPEG-4 MB.

FIG. 6 shows a CM determination method 600 for determining H.264 CMs to be considered for an incoming Inter16× 16 MPEG-4 MB or Inter8×8 MPEG-4 MB, including decision steps 602, 610, 620, 630, and 640, where the decision steps form a decision tree to distinguish individual cases for processing, by processing steps 605, 615, 625, 635, and 645. In each of the processing steps 605, 615, 625, 635, and 645 the incoming MB is evaluated, together with thresholds and ASARs, as required to determine the most appropriate, i.e. lowest cost, H.264 CM to be used for the MB.

In step 602 "Is Inter16×16", it is determined whether the received MB is a 16×16 or an 8×8 MB. In the case of an 8×8 MB (exit "N" from step 602), the Inter8×8 block is processed in step 605 "Process Inter8×8", otherwise the MB is an Inter16×16 MB. Note that H.264 CM selection for cases of incoming MPEG-4 Intra and Skip MBs has already been discussed above, and is not included in FIG. 6.

In step 610 "Is 1st Frame?", it is determined whether the frame containing the MB is in the first Inter frame after an Intra frame. In the case of a first Inter frame (exit "Y" from 602), step 615 "Process Inter16×16 Case 0" is executed, otherwise the next decision 620 is tested.

In step 620 "Is Case I?" it is determined whether the MB meets the condition described earlier for Inter16×16 Case I: $R_{n/G}^t \le \alpha_{16\times16}^{Skip} \cdot \mu_{16\times16,R/G}^{Skip,t-1}$ and $|v_{mp4} - v_p| \le 1$. In the case of "Is Case I?" being true (exit "Y" from 620), step 625 is executed in which the H.264 CM is set to Skip, otherwise the next decision 630 is tested.

In step 630 "Is Case IIa" it is determined whether the MB, not having met the condition for Case I, meets the first condition for the Inter16×16 Case II: $R_{n/G}^t \le \alpha_{16\times16}^{Skip} \cdot \mu_{16\times16,R/G}^{Skip,t-1}$ and $|v_{mp4} - v_p| > 1$. In the case of "Is Case IIa?" being true (exit "Y" from 630), step 635 "Process Inter16×16 Case II" is executed, otherwise the next decision 640 is tested.

In step 640 "Is Case IIb" it is determined whether the MB, not having met the first condition for Case II, meets the second condition the Inter16×16Case II: $\alpha_{16\times16}^{Skip} \cdot \mu_{16\times16,R/G}^{Skip,t-1} < R_{n/G}^t \le \alpha_{16\times16}^{16\times16} \cdot \mu_{16\times16,R/G}^{16\times16,t-1}$. In the case of "Is Case IIb?" being true (exit "Y" from 630), step 635 "Process Inter16×16 Case II" is executed, otherwise the default step 645 "Process Inter16×16 Case III" is executed.

Figure 7:
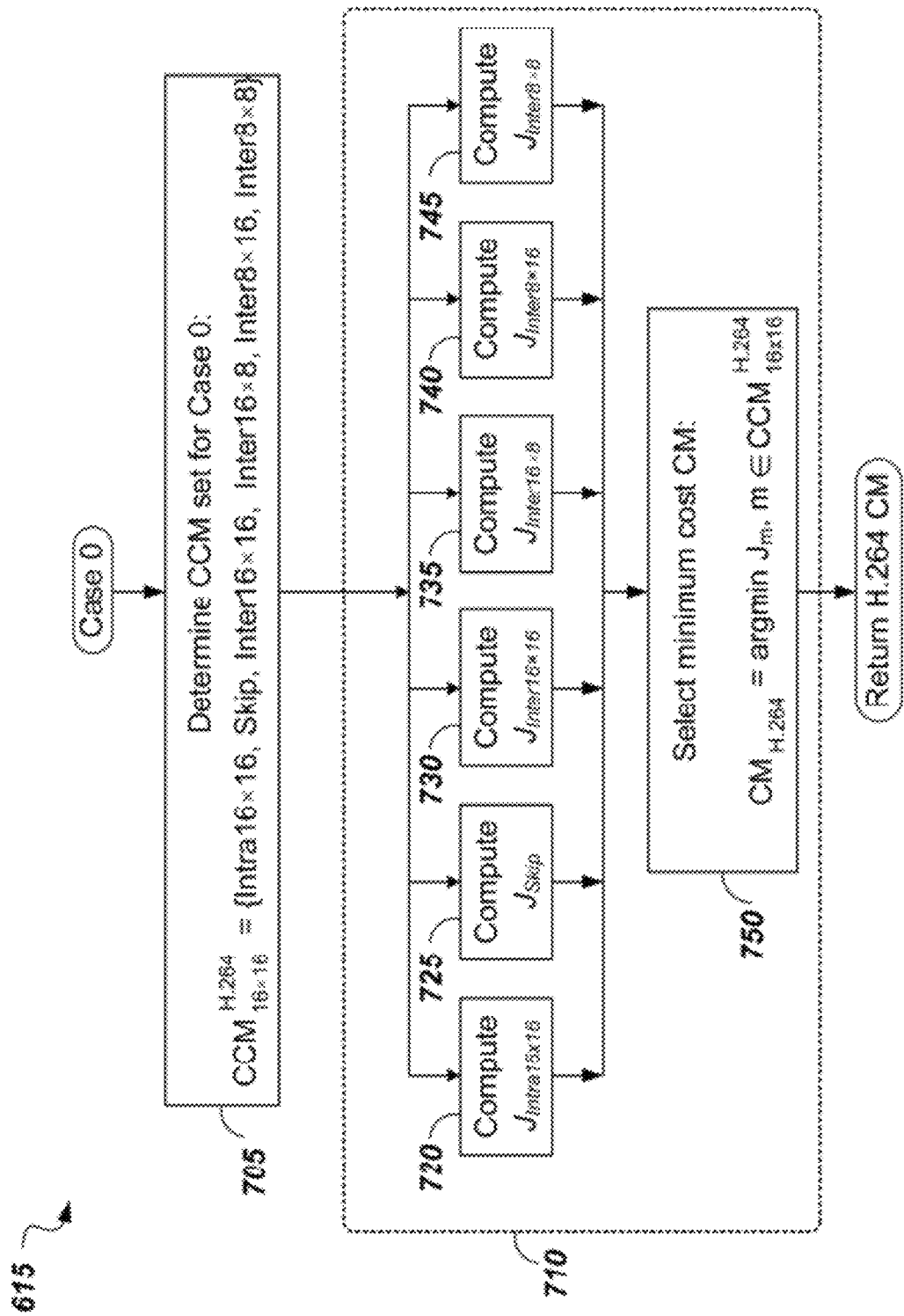
FIG. 7 shows a flow chart of the step 615 "Process Inter16×16 Case 0" of FIG. 6.

FIG. 7 shows a flow chart of the step 615 "Process Inter16×16 Case 0", including steps: 705 "Determine CCM set for Case 0"which defines the CCM set for Case 0 as $CCM_{16\times16}^{H.264}$={Intra16×16, Skip, Inter16×16, Inter16×8, Inter8×16, Inter8×8}; and a block 710 which includes Lagrangian Cost Computation steps 720 to 745 corresponding to the determined CCMs from step 705, each Lagrangian Cost Computation generating a cost J corresponding to the respective CCM. In a step 750 "Select minimum cost CM", the computed results from the steps 720-745 are compared and the lowest cost H.264 CM is selected as indicated by the relation CCM $_{H.264}$=arg min J$_m$,m ∈ CCM$_{16\times16}^{H.264}$and returned as the H.264 CM selected in the Inter16×16 Case 0.

Figure 8:
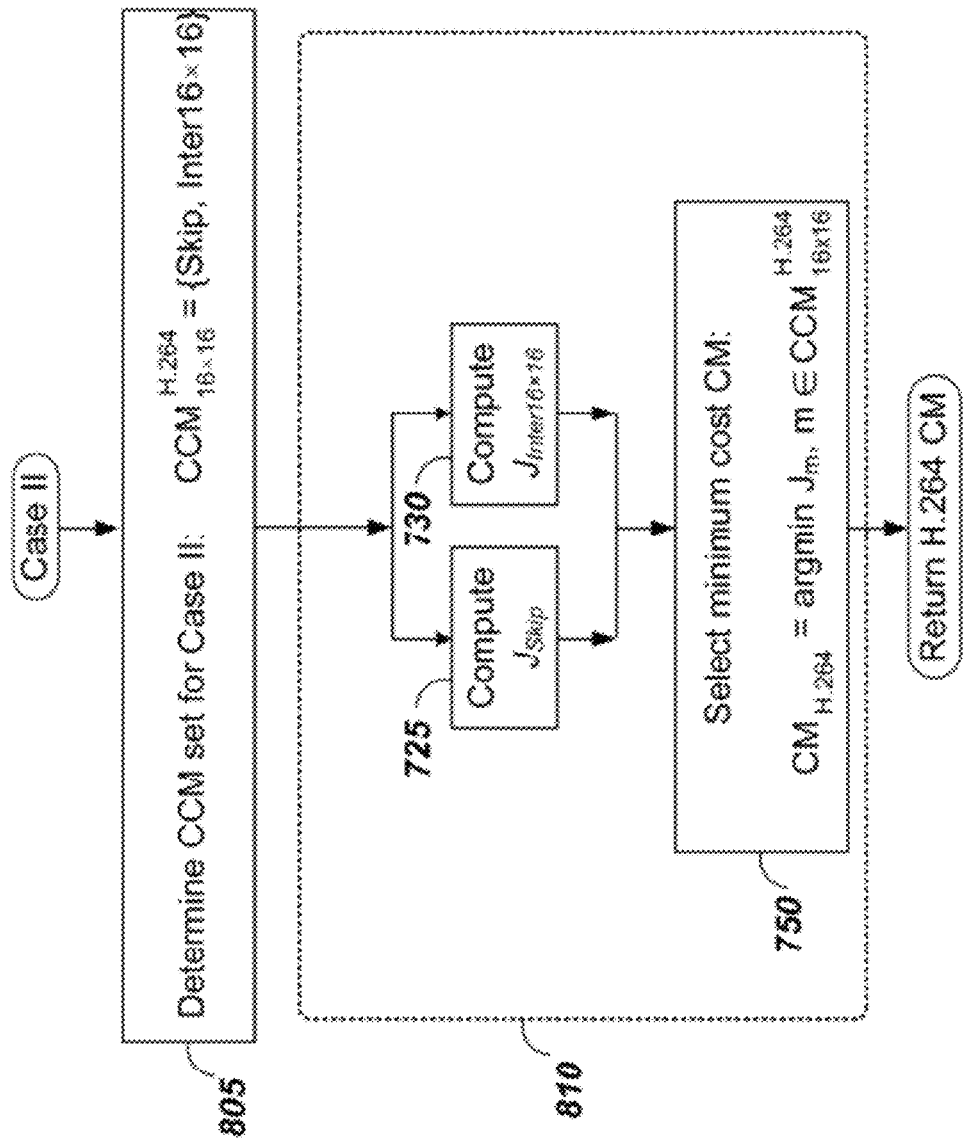
FIG. 8 is a flow chart of the step 635 "Process Inter16×16 Case II" of FIG. 6.

FIG. 8 is a flow chart of the step 635 "Process Inter16×16 Case II", including steps: 805 "Determine CCM set for Case II" which defines the CCM set for Case II as CCM$_{16\times16}^{H.264}$={Skip, Inter16×16}; and a block 810 which includes the Lagrangian Cost Computation steps 725 and 730 (see FIG. 7) corresponding to the determined CCMs from step 805, each Lagrangian Cost Computation generating a cost J corresponding to the respective CCM. In the step 750 "Select minimum cost CM", the computed results from the steps 725 and 730 are compared and the lowest cost H.264 CM is selected, as described above, and the H.264 CM selected in the Inter16×16 Case II is returned.

Figure 9:
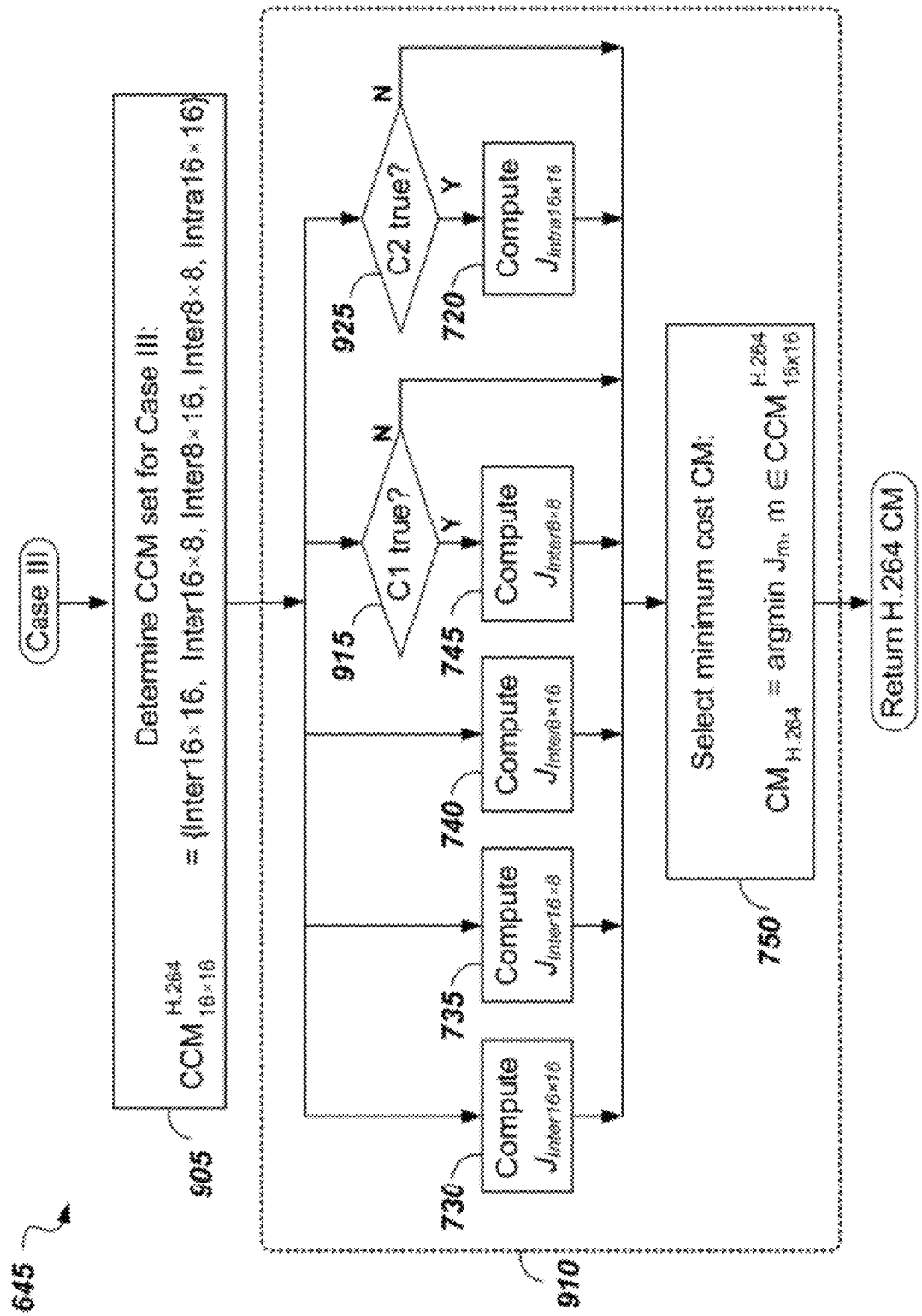
FIG. 9 is a flow chart of the step 645 "Process Inter16×16 Case III" of FIG. 6.

FIG. 9 is a flow chart of the step 645 "Process Inter16×16 Case III", including steps:

905 "Determine CCM set for Case III" which defines the CCM set for Case III as CCM$_{16\times16}^{H.264}$={Inter16×16, Inter16×8, Inter8×16, Inter8×8, Intra16×16}; and a block 910 which includes the Lagrangian Cost Computation steps 730 to 745 (see FIG. 7) corresponding to respective determined CCMs from step 905, each Lagrangian Cost Computation generating a cost J corresponding to the respective CCM.

In steps 915 "C1 true?" and 925 "C2 true?", conditions C1 and C2 are evaluated by which it is determined if the candidate CMs Inter8×8 and Intra16×16 respectively should be evaluated. As described above, condition C1 is true if $R_{n/G}^t > \alpha_{16\times16}^{16\times16} \cdot \mu_{16\times16,R/G}^{16\times16,t-1}$ and condition C2 is true if $R_{n/G}^t > \alpha_{16\times16}^{8\times8} \cdot \mu_{16\times16,R/G}^{8\times8,t-1}$. If C1 is true (exit Y from step 915), a Lagrangian Cost Computation generating a cost J corresponding to the candidate CM "Inter8×8" is performed in the step 745, otherwise this candidate CM is not evaluated. Similarly, if C2 is true (exit Y from step 925), a Lagrangian Cost Computation generating a cost J corresponding to the candidate CM "Intra16×16" is performed in the step 720, otherwise this candidate CM is not evaluated.

In the step 750 "Select minimum cost CM", the computed results from the steps 720 and 730-745 are compared and the lowest cost H.264 CM is selected, as described above, and the H.264 CM selected in the Inter16×16 Case III is returned.

Figure 10:
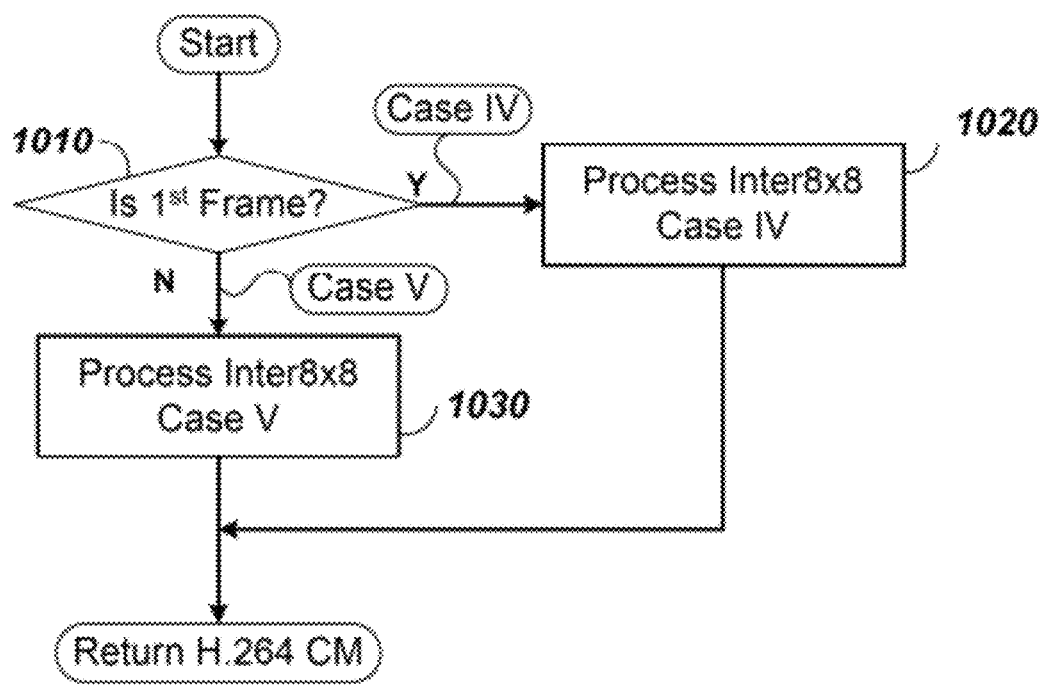
FIG. 10 shows an expansion of the step 605 "Process Inter8×8" of FIG. 6.

FIG. 10 shows an expansion of the step 605 "Process Inter8×8", including a decision step 1010 "Is 1$^{st}$ Frame?"; in which it is determined whether the frame containing the incoming Inter8×8 MB is in the first Inter frame after an Intra frame. In the case of a first Inter frame (exit "Y" from 1010), a step 1020 "Process Inter8×8 Case IV" is executed, otherwise a step 1030 "Process Inter8×8 Case V" is executed. In either case, a selected H.264 CM is returned from the step 605.

Figure 11:
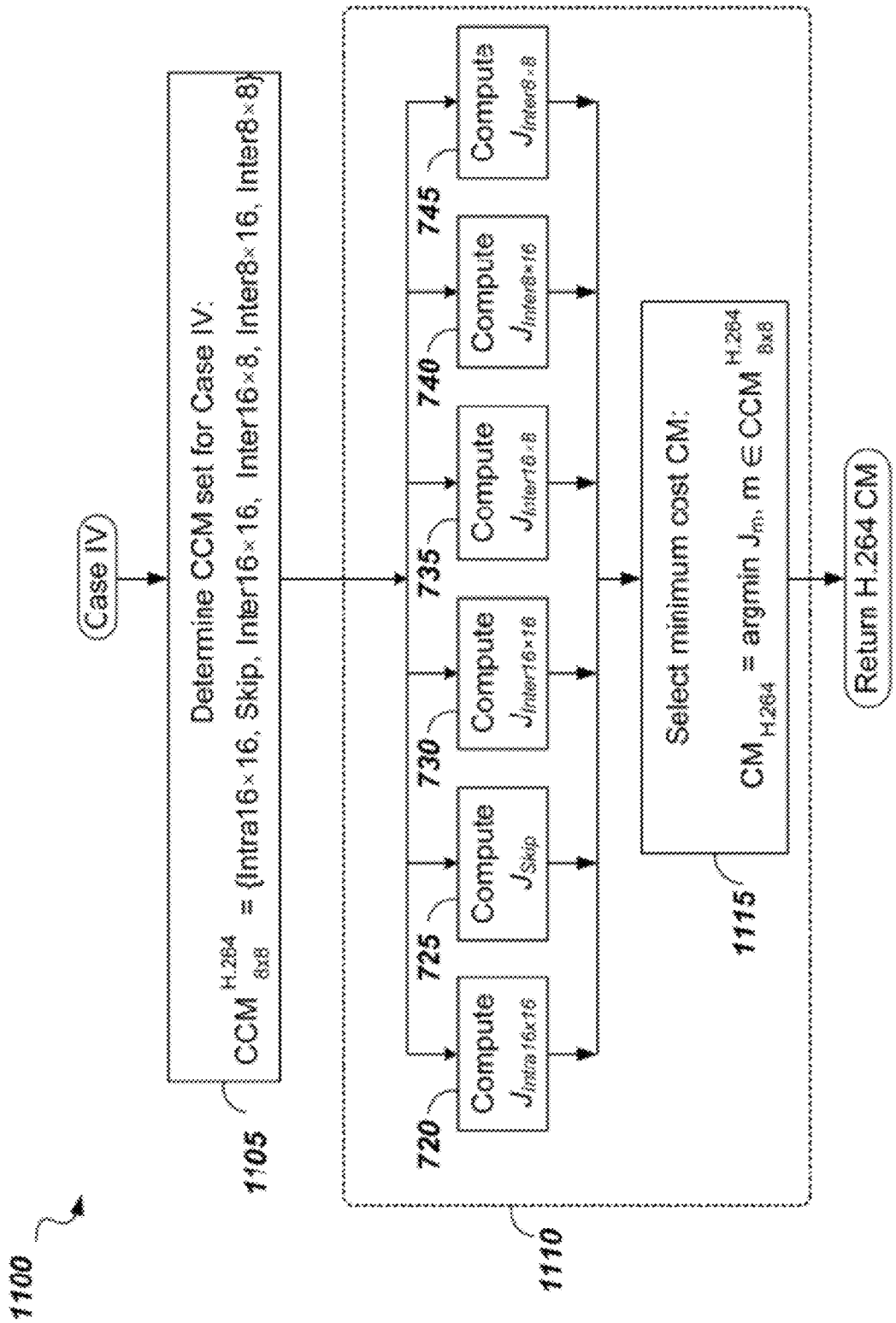
FIG. 11 is a flow chart of the step 1020 "Process Inter8×8 Case IV" of FIG. 10.

FIG. 11 is a flow chart of the step 1020 "Process Inter8×8 Case IV", including steps: 1105 "Determine CCM set for Case N" which defines the CCM set for Case IV as CCM$_{8\times8}^{H.264}$={Intra16×16, Skip, Inter16×16, Inter16×8, Inter8×16, Inter8×8}; and a block 1110 which includes Lagrangian Cost Computation steps 720 to 745 corresponding to the determined CCMs from step 1105, each Lagrangian Cost Computation generating a cost J corresponding to the respective CCM. In a step 1115 "Select minimum cost CM", the computed results from the steps 720 to 745 are compared and the lowest cost H.264 CM is selected as indicated by the relation CCM$_{H.264}$=argmin J$_m$, m ∈ CCM$_{8\times8}^{H.264}$ and returned as the H.264 CM selected in the Inter8×8 Case N. The step 1115 of FIG. 11 is analogous to the step 750 but selects the lowest cost CM from the set CCM$_{8\times8}^{H.264}$ instead of the set CCM$_{16\times16}^{H.264}$.

Figure 12:
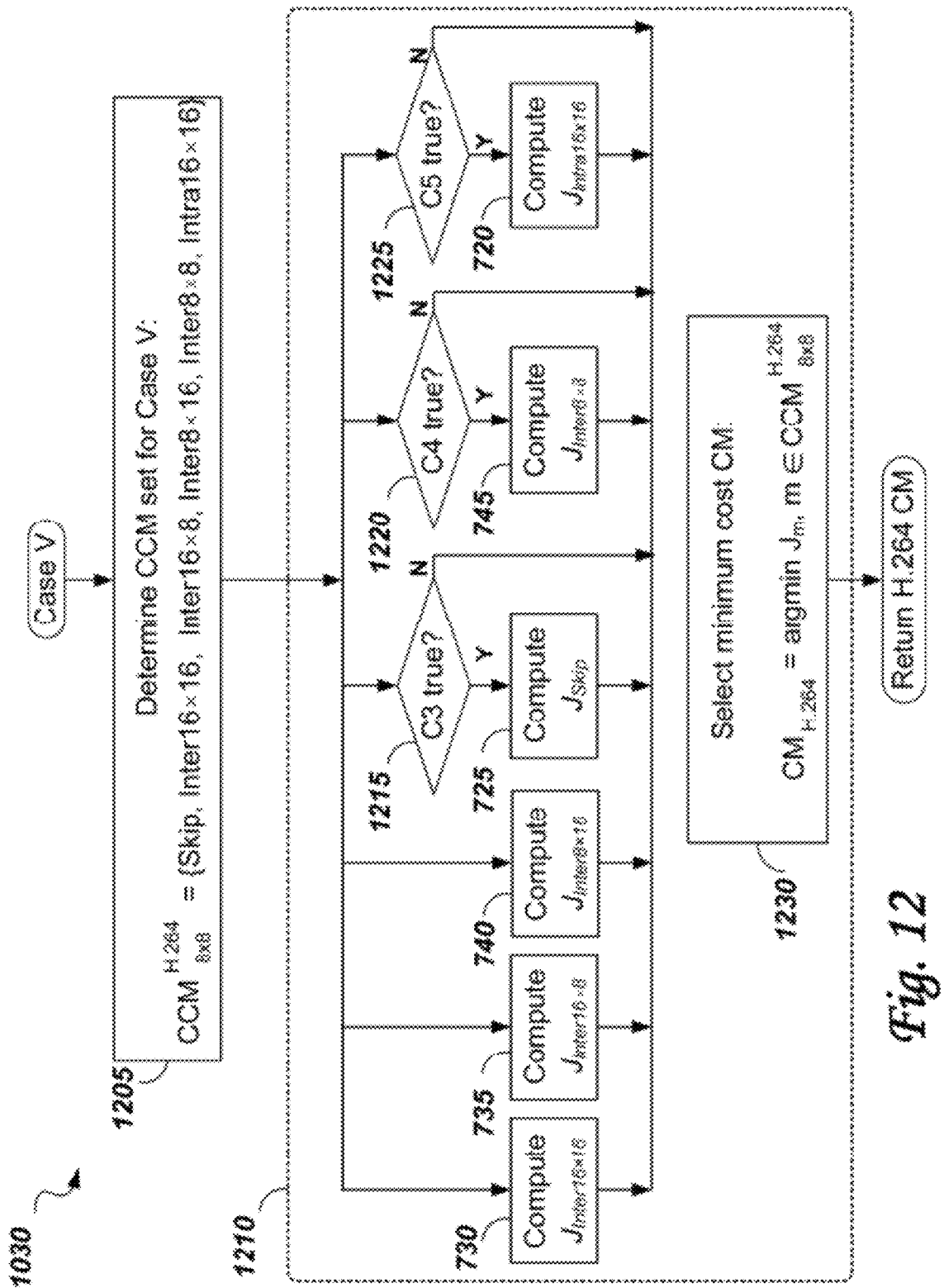
FIG. 12 is a flow chart of the step 1030 "Process Inter8×8 Case V" of FIG. 10.

FIG. 12 is a flow chart of the step 1030 "Process Inter8×8 Case V", including steps: 1205 "Determine CCM set for Case V" which defines the CCM set for Case V as CCM$_{8\times8}^{H.264}$={Skip, Inter16×16, Inter16×8, Inter8×16, Inter8×8 and Intra16×16}; and a block 1210 which includes the Lagrangian Cost Computation steps 720 to 745 (see FIG. 7) corresponding to respective determined CCMs from step 1205, each Lagrangian Cost Computation generating a cost J corresponding to the respective CCM.

In steps 1215 "C3 true?", 1220 "C4 true?" and 1225 "C5 true?", conditions C3, C4 and C5. are evaluated by which it is determined if the candidate CMs Skip, Inter8×8 and Intra16×16 respectively should be evaluated. As described in equations (13), (14) and (15) above, condition C3 is true if $R_{n/G}^t < \alpha_{8\times8}^{16\times16} \cdot \mu_{8\times8,R/G}^{16\times16,t-1}$ and $|v_i - v_{p_i}| \leq 1, \forall i \in \{1,2,3,4\}$, condition C4 is true if $R_{n/G}^t > \alpha_{8\times8}^{8\times8} \cdot \mu_{8\times8,R/G}^{8\times8,t-1}$ and condition 5 is true if $R_{n/G}^t > \alpha_{8\times8}^{Intra} \cdot \mu_{8\times8,R/G}^{Intra,t-1}$ and $\mu_G$>Thr. If C3 is true (exit Y from step 1215), a Lagrangian Cost Computation generating a cost J corresponding to the candidate CM "Skip" is performed in the step 725, otherwise this candidate CM is not evaluated. Similarly, if C4 is true (exit Y from step 1220), a Lagrangian Cost Computation generating a cost J corresponding to the candidate CM "Inter8×8" is performed in the step 745, otherwise this candidate CM is not evaluated. And further similarly, if C5 is true (exit Y from step 1225), a Lagrangian Cost Computation generating a cost J corresponding to the candidate CM "Intra16×16" is performed in the step 720, otherwise this candidate CM is not evaluated.

In the step 1230 "Select minimum cost CM", the computed results from the steps 720 to 745 are compared and the lowest cost H.264 CM is selected, as described above, and the H.264 CM selected in the Inter8×8 Case V is returned.

Processing any of the steps 605, 615, 625, 635, or 645, as determined by the decision tree of the steps 602, 610, 620, 630, and 640, ultimately results in the selection of the lowest cost H.264 CM to be used for encoding the incoming MB in the H.264 encoder. Lowest cost in this case is determined as the least distortion caused by using the selected CM. The cost comparison by the Lagrangian Cost Computations mentioned above takes into account a determination of the motion vectors and their possible refinement for improving the visual quality, to be described in the next section.

FIG. 13 shows two tables 1310 and 1320, listing statistics of frequency distribution of output H.264 CMs corresponding to each case of MPEG-4 inter 16×16 input CM using the proposed classification algorithm. The statistics were gathered during a cascade transcoding for several QCIF videos at 32 kbps (Table 1310) and 160 kbps (Table 1320) using Intel's H.264 encoder and reflect resulting probabilities of each H.264 CM selected for each 16×16 incoming MPEG-4 MB, classified by case. Statistics were collected only for Inter16×16 cases I, II and III. From the statistics, it is seen that the three sub-classifications made for Inter16×16 will allow a significantly reduction in testing (evaluating) H.264 CMs while covering the most probable CMs. Although not illustrated, reduction in testing is also achieved for 8×8 incoming MPEG-4 MBs using the proposed method.

It is important to note that all constants used in our system were empirically determined by simulations on training video sequences, which were different from those tested. The training video sequences used are QCIF sequences Akiyo, Bridgeclose, Coastguard and CIF sequences Container, Mobile and Waterfall.

It should also be mentioned that we assumed that the H.264 output frame type was the same as the incoming MPEG-4 frame type, i.e. the same intra refresh rate.

Motion Vector Determination Algorithm

MVs strongly influence the visual quality of transcoded videos since the compression efficiency highly depends on them. According to several experiments we conducted, increasing the MVs' accuracy from half- to a quarter-pixel increases the quality by ≈2 dB, depending on the type of video. The H.264 MV accuracy is at quarter-pel, while for MPEG-4, it can be half- or a quarter-pel, depending on the profile supported. In the proposed algorithm, we address the transcoding of MPEG-4 VSP using half-pel accuracy to the H.264 baseline. It is a well-known fact that ME is one of the most demanding video compression modules in terms of computational complexity. As our main goal is to reduce the processing time, we will expand on the ideas we have presented in the paper of I. Metoevi and S. Coulombe "Efficient MPEG-4 to H.264 transcoding exploiting MPEG-4 block modes, motion vectors and residual", ISCIT, Incheon, South Korea, Sept 2009. We propose to use MPEG-4 MVs in H.264, but after a conditional refinement from half- to a quarter-pel, which increases the quality while avoiding unproductive computations. A small diamond search at quarter-pel precision is used to perform MV refinement in the paper of A.M. Tourapis, "Enhanced Predictive Zonal Search for Single and Multiple Frame Motion Estimation,"*Visual Communications and Image Processing*, pp. 1069-1079, January 2002.

In the small diamond search, the sum of absolute transform differences (SATD) value of the current MV is compared with its top, left, right and down positions. The current position is chosen if it has the minimum SATD, otherwise it is moved to the position having the minimum SATD, and the process is repeated.

As for CM determination, we propose the use of the RSAR to classify MBs. An MB with a low $R^{n/Gt}$ is assumed to have MPEG-4 MVs accurately representing its motion, and such an MB will not be refined. On the other hand, an MB with a high $R_{n/G}^t$ is assumed to not accurately represent its motion, and will therefore be refined. As for CM determination, statistics collected during the transcoding of the previous frame (namely, $\mu_{8\times8,R/G}^{8\times8,t-1}$ and $\mu_{16\times16,R/G}^{16\times16,t-1}$) will serve as thresholds for deciding whether MV refinement is required in the transcoding of an MB. This conditional refinement applies only in cases of transitions to similar CMs, such as Inter16×16 to Inter16×16 or Inter8×8 to Inter8×8. However these cases occur with a high probability, and so the proposed conditional refinement will therefore have a significant impact on complexity. In the case of a different CM transition, all MVs are refined without exception, but incoming MV information is reused nevertheless.

During the transcoding of a frame t following intra frames, i.e., $[t \bmod T_r]=1$, we do not have data on $\mu_{16\times16,R/G}^{16\times16,t-1}$ and $\mu_{8\times8,R/G}^{8\times8,t-1}$. Therefore, all MVs are refined without exception. The H.264 MV determination is detailed in the following subsections, but first, we introduce the following notations:

$v_k$ denotes the incoming MPEG-4 MV associated with partition k of an MB.

$v_{ocm,k}$ denotes the outgoing H.264 MV associated with partition k of coding mode ocm. For example, $v_{16\times16,k}$ denotes the H.264 MV associated with partition k of the CM Inter16×8. In the case of Inter16×16, we will omit the k since there is a single partition.

$F(v_i)$ denotes the refinement or fine-tuning operation on MV $v_i$.

MV Determination for an Incoming Skip MPEG-4 MB

For this incoming type of MB, we have seen that $CCM_{Skip}^{H.264}=\{Skip, Inter16\times16\}$. When testing for Inter16×16, the ME is performed from scratch. However, many modern motion estimation algorithms, for example A. M. Tourapis, O. C. Au and M. L. Liou, "Predictive Motion Vector Field Adaptive Search Technique (PMVFAST)-Enhancing Block Based Motion Estimation," Department of Electrical and Electronic Engineering, Hong Kong University of Science and Technology, Hong Kong, 2000, and A. M. Tourapis, "Enhanced Predictive Zonal Search for Single and Multiple Frame Motion Estimation," *Visual Communications and Image Processing*, pp. 1069-1079, January 2002 will first test MV=(0,0) as well as other probable MVs and quickly terminate their search.

MV Determination for an Incoming Inter16×16 MPEG-4 MB

In this case, we propose to proceed as follows. For H.264 CMs different from Inter16×16, MVs are always refined. In the case of Inter16×16, MVs are refined only if $R_{n/G}^t$ exceeds a threshold. The proposed Inter16×16 MV determination process for an incoming MPEG-4 MV, $v_0$, is summarized as follows for each H.264 candidate CM:

Inter16×16:

$$v_{16\times16} = \begin{cases} F(v_0) & \text{if } R_{n/G}^t > \alpha_{mv} \cdot \mu_{16\times16,R/G}^{16\times16,t-1} \\ v_0 & \text{if } R_{n/G}^t \leq \alpha_{mv} \cdot \mu_{16\times16,R/G}^{16\times16,t-1} \end{cases}$$

Inter16×8: $v_{16\times8,k}=F(v_0)$, k=0,1.
Inter8×16: $v_{8\times16,k}=F(v_0)$, k=0,1.
Inter8×8: $v_{8\times8,k}=F(V_0)$, k=0,1,2,3.

where $\alpha_{mv}$ is an adjustment factor controlling the quality/speedup (Q/S) tradeoff, fixed at 0.2 in our simulations. It is understood that another values of $\alpha_{mv}$ can be also used as required depending on coding modes.

Figure 14:
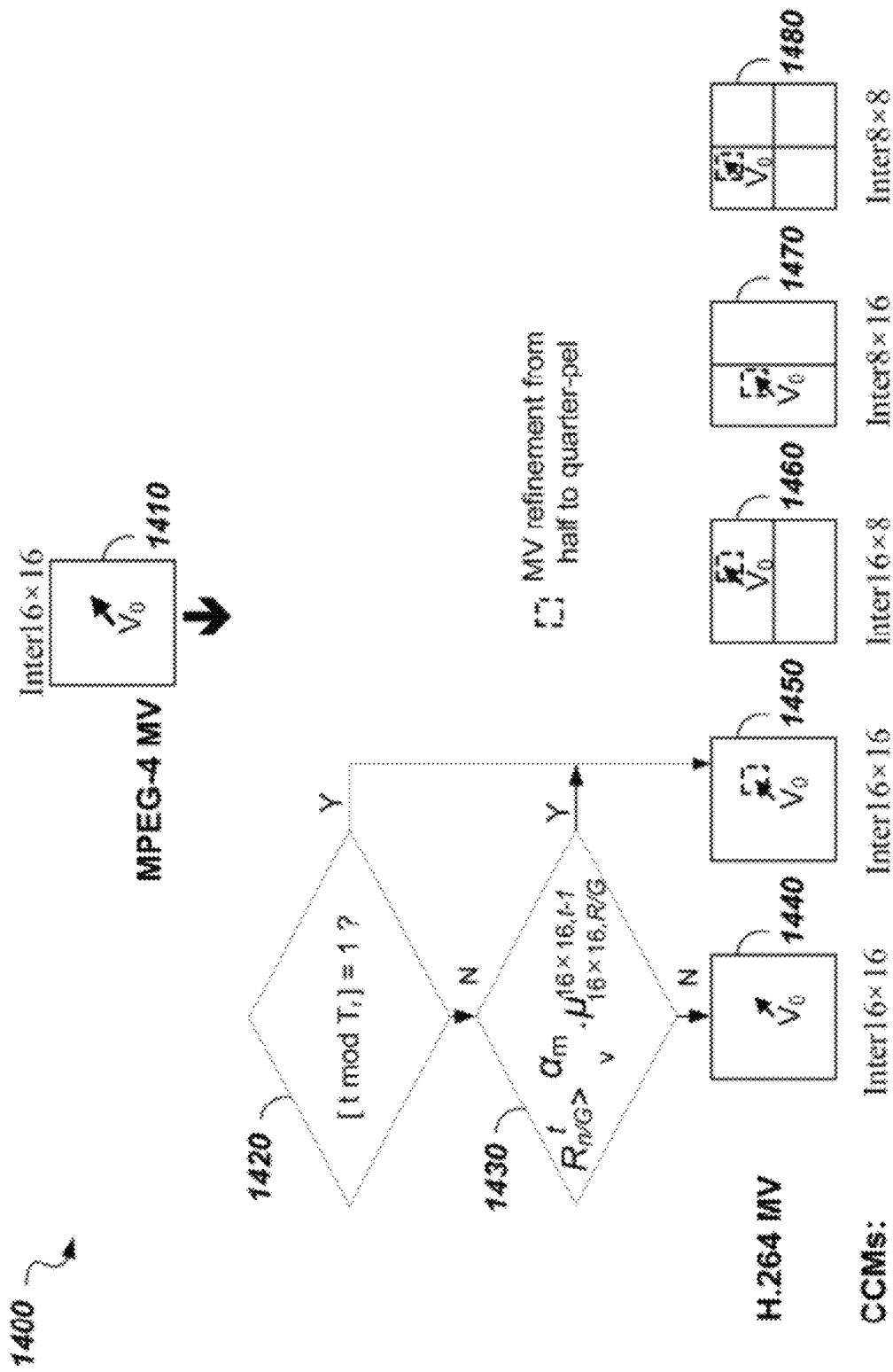
FIG. 14 shows a diagram 1400 which summarizes the H.264 MV determination process for an incoming Inter16×16 MPEG-4 MB.

FIG. 14 shows a diagram 1400 which summarizes the H.264 MV determination process for an incoming Inter16×16 MPEG-4 MB, including an incoming MPEG-4 motion vector 1410, decision steps 1420 and 1430, and MB symbols indicating resulting output H.264 motion vectors for CCMs of: Inter16×16 without MV refinement (ref 1440); Inter16×16 with MV refinement (ref. 1450); Inter16×8 with MV refinement (ref. 1460); Inter8×16 with MV refinement (ref. 1470) and Inter8×8 with MV refinement (ref. 1480).

The step 1420 illustrates that the first frame (t mod Tr=1) always triggers MV refinement of the Inter16×16 CM 1450 (exit Y from step 1420) as indicated by the MB symbol 1450. But MVs in MBs in non-first frames, if resulting in H.264 Inter16×16, are refined only if the condition of decision step 1430: $R_{n/G}^t > \alpha_{mv} \cdot \mu_{16\times16,R/G}^{16\times16,t-1}$ is met. The motion vectors in the other H.264 CMs (Inter16×8, Inter8×16 and Inter 8×8) are always refined.

MV Determination for an Incoming Inter8×8 MPEG-4 MB

In the case of an incoming Inter8×8 MPEG-4 MB, we propose to reuse and refine the MVs for H.264 CM candidates Inter16×16, Inter16×8 and Inter8×16. Since these partitions are larger than the incoming Inter8×8 partition, we will select the best incoming MVs within each H.264 candidate partition, using the motion Lagrangian cost function J(v). For the most used sum of absolute differences (SAD) or SATD distortion criteria, the Lagrangian function is defined as:

$$J(v)=SA(T)D(v)+\lambda_{motion}R(v-v_p) \qquad (16)$$

where $\lambda_{motion}$ is the Lagrangian multiplier and $R(v-v_p)$ the bits needed to send the MVs. Please see the aforementioned article "Text Description of Joint Model Reference Encoding Methods and Decoding Concealment Methods," by K. P. Lim, G. Sullivan and T. Wiegand, Joint Video Team Document JVT-O079, April 2005, for details. In the case of Inter8×8, MV $v_k$ associated with partition k is refined only if $R_{(n,k)/G}^t$ exceeds a threshold, $\alpha_{mv} \cdot \mu_{8\times 8,R/G}^{8\times 8,t-1}$. The proposed Inter8×8 MV determination process for an incoming MPEG-4 MV, $v_k$ (k=0,1,2,3), is summarized as follows for each H.264 candidate CM:

Inter16×16:
$v_{16\times 16} = \mathrm{argmin}_v J(F(v))$, $v \in \{v_0, v_1, v_2, v_3\}$.
Inter16×8:
$v_{16\times 8,k} = \mathrm{argmin}_v J(F(v))$, $v \in \{v_{2k}, v_{2k+1}\}$, k=0,1.
Inter8×16:
$v_{8\times 16,k} = \mathrm{argmin}_v J(F(v))$, $v \in \{v_k, v_{k+2}\}$, k=0,1.
Inter8×8:

$$v_{8\times 8,k} = \begin{cases} F(v_k) & \text{if } R^t_{(n,k)/G} > \alpha_{mv} \cdot \mu_{8\times 8,R/G}^{8\times 8,t-1} \\ v_k & \text{if } R^t_{(n,k)/G} \le \alpha_{mv} \cdot \mu_{8\times 8,R/G}^{8\times 8,t-1} \end{cases}, k = 0, \square, 3.$$

Figure 15:
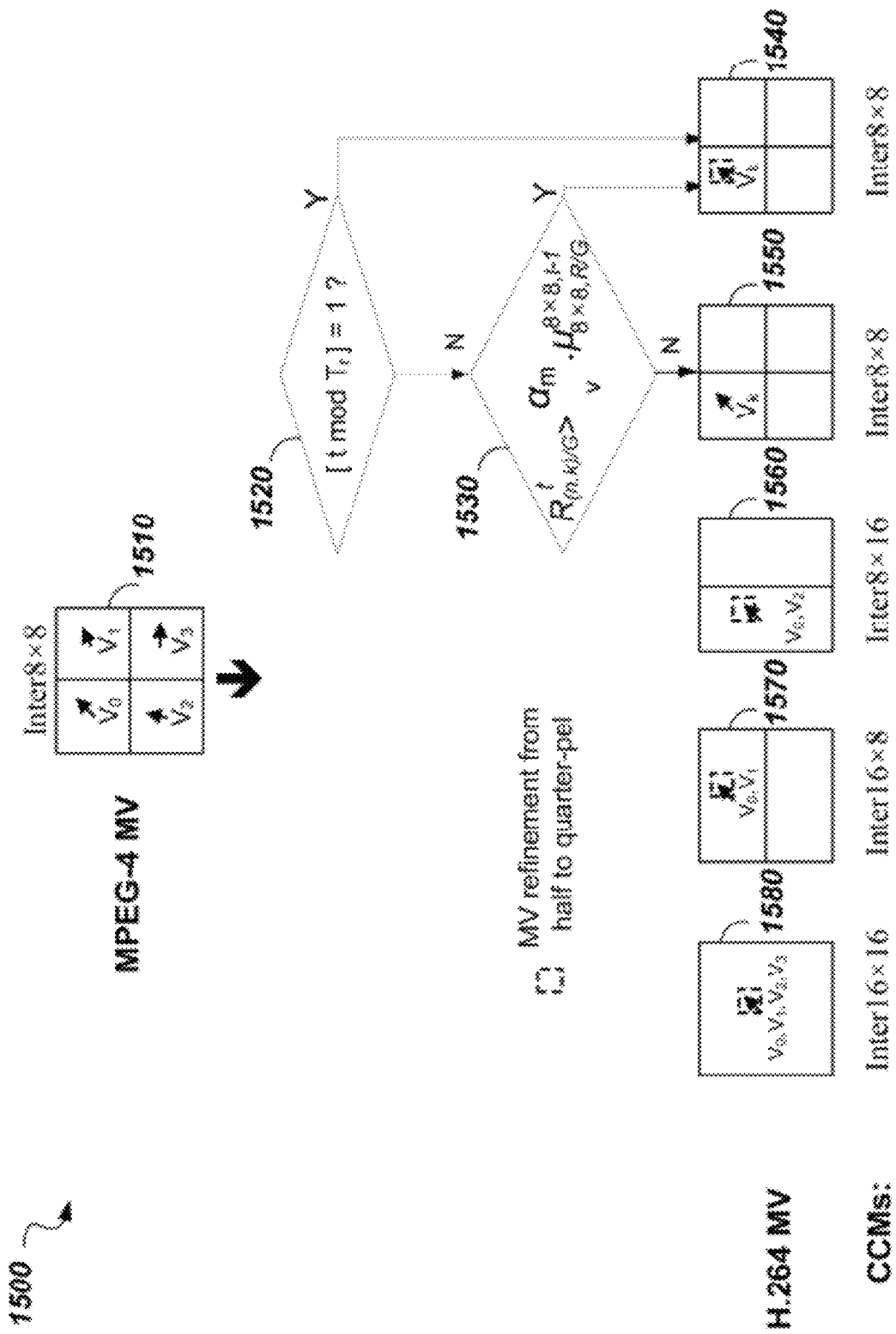
FIG. 15 shows a diagram 1500 which summarizes the H.264 MV determination process for an incoming Inter8×8 MPEG-4 MB.

FIG. 15 shows a diagram 1500 which summarizes the H.264 MV determination process for an incoming Inter8×8 MPEG-4 MB, including incoming MPEG-4 motion vectors 1510, decision steps 1520 and 1530, and MB symbols indicating resulting output H.264 motion vectors for CCMs of: Inter8×8 with MV refinement (ref. 1540); Inter8×8 without MV refinement (ref. 1550); Inter8×16 with MV refinement (ref 1560); Inter16×8 with MV refinement (ref. 1570) and Inter16×16 with MV refinement (ref. 1580).

The step 1520 illustrates that the first frame (t mod Tr=1) always triggers MV refinement of the Inter8×8 CM (exit Y from step 1520) as indicated by symbol 1540. But MVs in MBs in non-first frames, if resulting in H.264 Inter8×8, are refined only if the condition of decision step 1430: $R_{(n,k)/G}^t > \alpha_{mv} \cdot \mu_{8\times 8,R/G}^{8\times 8,t-1}$ is met. The motion vectors in the other H.264 CMs (Inter16×8, Inter8×16 and Inter 8×8) are always refined.

Once the set of candidate CMs and their associated MVs have been determined, the encoder computes the CMs Lagrangian cost $J_m$ for each candidate CM m and selects the CM with the minimum cost as H.264 CM, $CM_{H.264} \cdot J_m$ is defined as:

$$J_m = D + \lambda_m R \qquad (17)$$

with D the distortion, $\lambda_m$ the CM Lagrangian multiplier, and R the bits needed to send the CM information. Research in information theory, described in the aforementioned article "Text Description of Joint Model Reference Encoding Methods and Decoding Concealment Methods," by K. P. Lim, G. Sullivan and T. Wiegand, Joint Video Team Document JVT-O079, April 2005, has shown that optimum results are obtained for $\lambda_{motion} = \sqrt{\lambda_m}$ and that there is a strong dependency between the quantization step, QP, and $\lambda_m$. In the Intel codecs, the multiplier Lagrangian $\lambda_m$ is set to $$0.85 \times 2^{\frac{QP-12}{3}}.$$

Experimental Results

Extensive simulations were conducted to test the proposed algorithms in terms of quality and speedup. The algorithms were implemented using the MPEG-4 and H.264 codecs delivered as sample code in the Intel Integrated Performance Primitive (IPP) library, version 5.3,Intel Integrated Performance Primitives 5.3 —Code Samples, which are cited in the information disclosure statement for this application. These video codecs are highly optimized as compared to the MPEG-4 and H.264 reference codecs "MoMuSys" described in ISO/IEC 14496-5:2001, "Information technology—Coding of audio-visual objects—Part 5: Reference software," second edition, February 2005, and "JM" described in_a H.264/AVC reference software JM 15.1, which has been cited in the information disclosure statement for this application. Although the H.264 JM is an excellent reference to use to validate rate distortion performance, it is not optimized for speed, and can therefore not be used as a reliable reference to measure speedup improvements. The results on Intel's codecs are much more representative of the gains obtainable with a real transcoding product.

The simulations were conducted for several video sequences at different resolutions, from QCIF to HD, on an Hewlett Packard (HP) G62 system equipped with an Intel Core i5-430M 2.53 GHz processor (although similar results were obtained on other Intel-based processors). The video sequences were initially encoded with high quality using MPEG-4 VSP at 30 fps with one intra frame for every 100 inter frames (i.e., every 3.3 s) at 200 kbps, 720 kbps, 2.88 Mbps and 16.4 Mbps for QCIF, CIF, 4CIF and HD 1920×1080p, respectively (other initial rates were tested with small differences in final performance). MPEG-4 MV accuracy was set to half-pel and MVs were found using the logarithmic algorithm described in an article by J. R. Jain and A. K. Jain, "Displacement Measurement and its Application in Interframe Image Coding," *IEEE Transactions on Communications*, Vol. COM-29, pp. 1709-1808, December 1981. The H.264 encoding options were: RDO, maximum quality, one reference frame, and SATD instead of SAD; no B frames were used, and the MV accuracy was set to a quarter-pel and ME was performed using EPZS (Enhanced Predictive Zonal Search).

The method of the present invention was compared against state-of-the-art methods and algorithms: STAT (the statistical method without MV refinement according to Y. K. Lee, S. S. Lee and Y. L. Lee, "MPEG-4 to H.264 Transcoding using Macroblock Statistics," *IEEE International Conference on Multimedia and Expo*, pp. 57-60, July 2006), STAT+REF (the statistical method with MV refinement, also according to Y. K. Lee et al.), MV+MS (the method Selection Mode with MV refinement according to Y. Liang, X. Wei, I. Ahmad and V. Swaminahan, "MPEG-4 to H.264/AVC Transcoding," *The International Wireless Communications and Mobile Computing Conference*, pp. 689-693, August 2007,cited earlier), ResidualM (our earlier algorithm based on residual as in our earlier proposal cited above). The cascade method was also used, and serves as the reference for quality and speedup.

Figure 16:
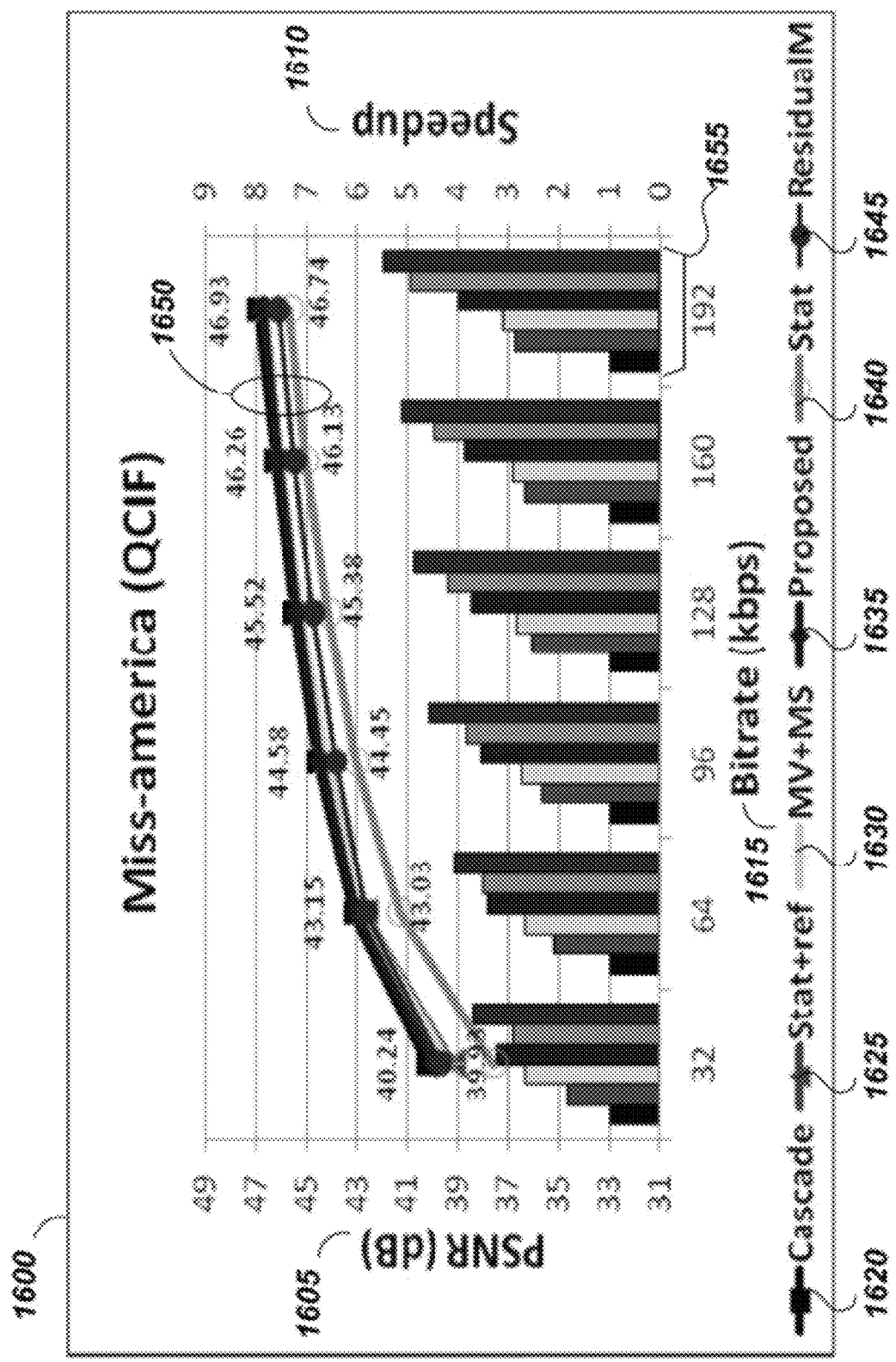
FIG. 16 shows a graph 1600, showing results for PSNR in dB (vertical scale 1605) and speedup (vertical scale 1610) for transcoding the QCIF Miss-America video as a function of bitrate in kbps (horizontal scale 1615) according to different transcoding methods.
Figure 17:
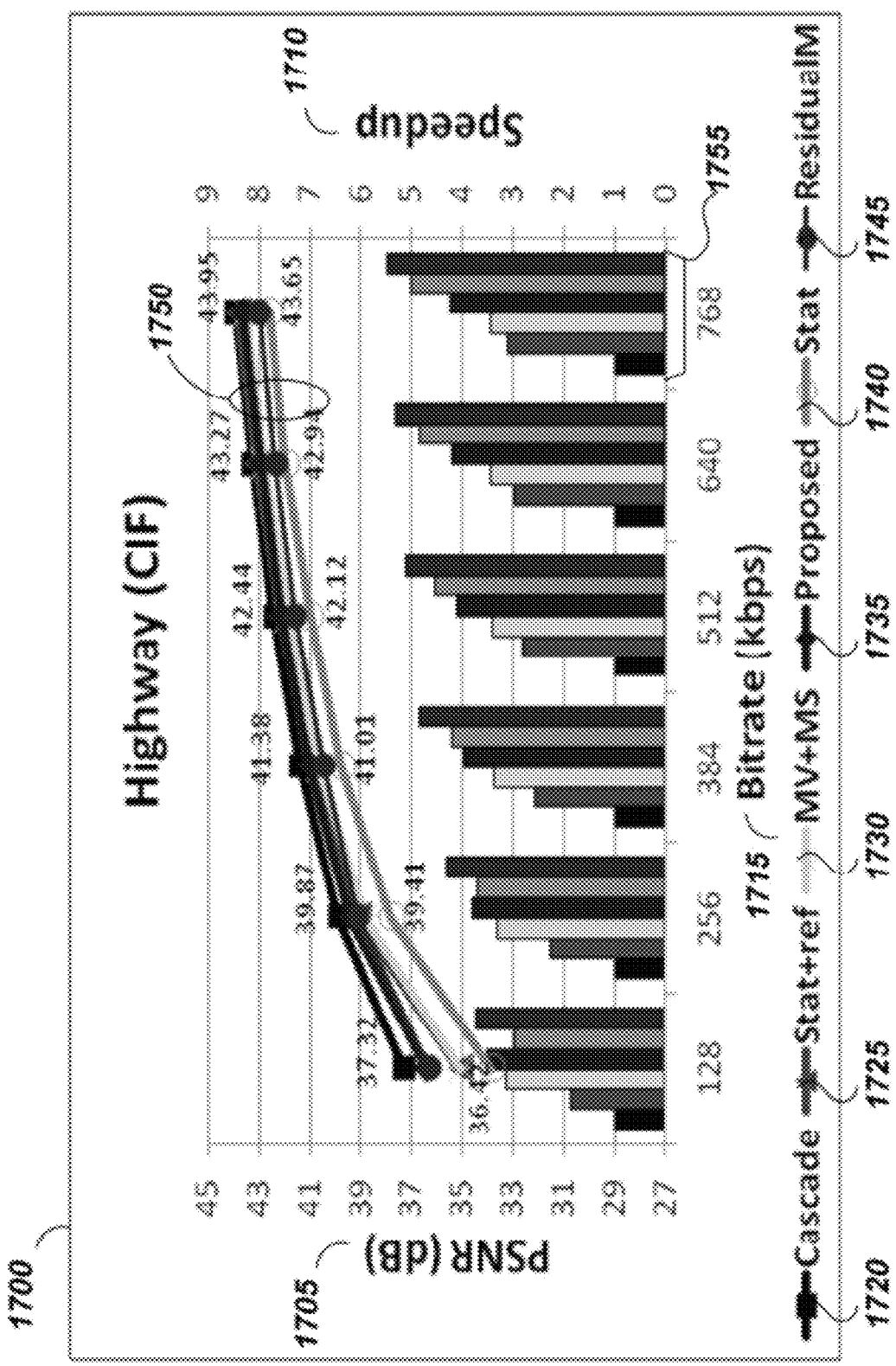
FIG. 17 is a graph 1700, showing results for PSNR in dB (vertical scale 1705) and speedup (vertical scale 1710) for transcoding the CIF Highway America video as a function of bitrate in kbps (horizontal scale 1715) according to different transcoding methods.
Figure 18A:
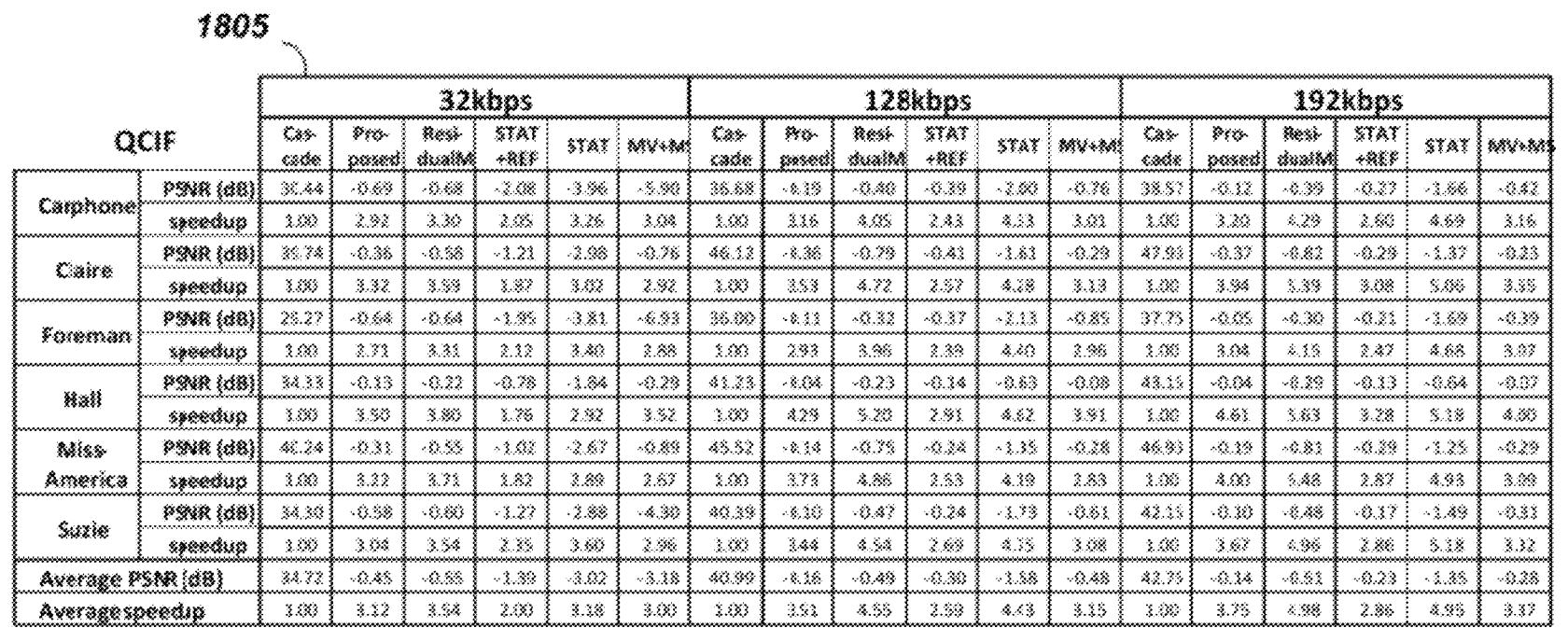
Figure 18B:
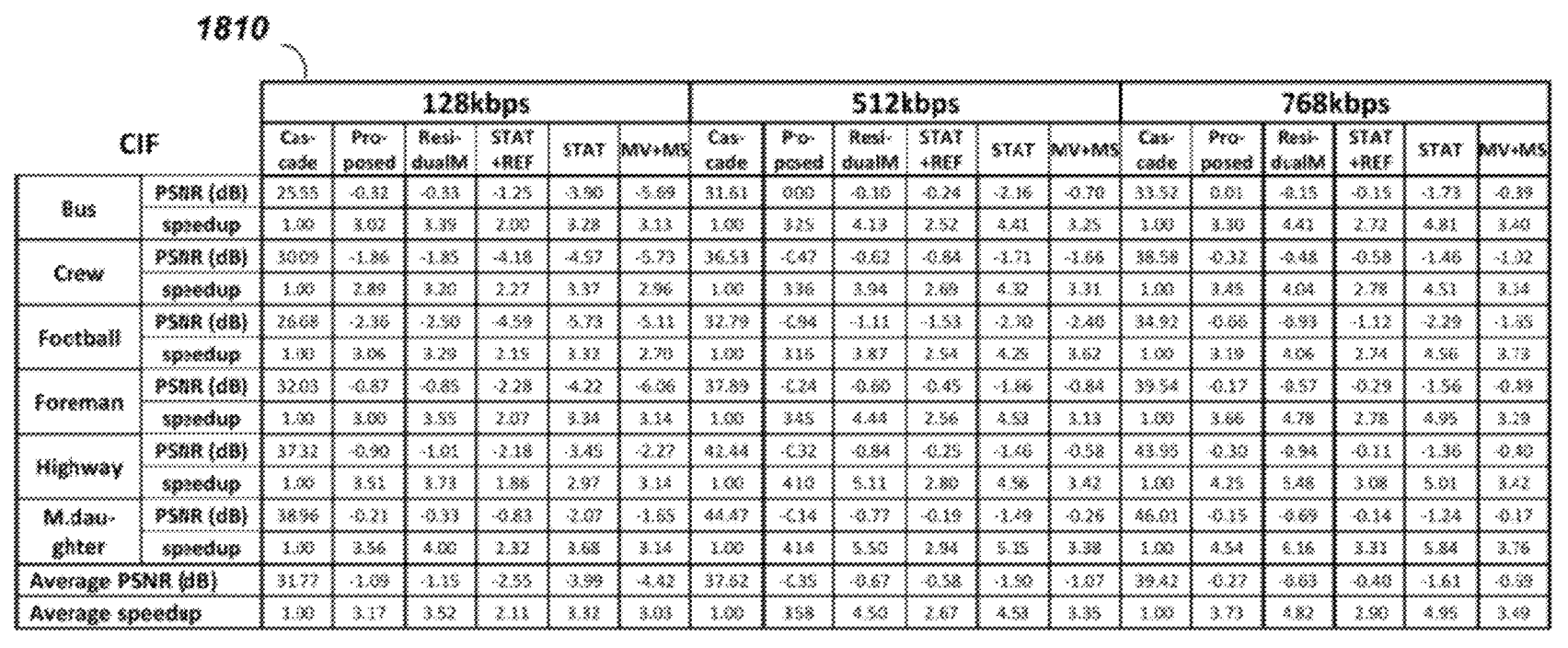
Figure 18C:
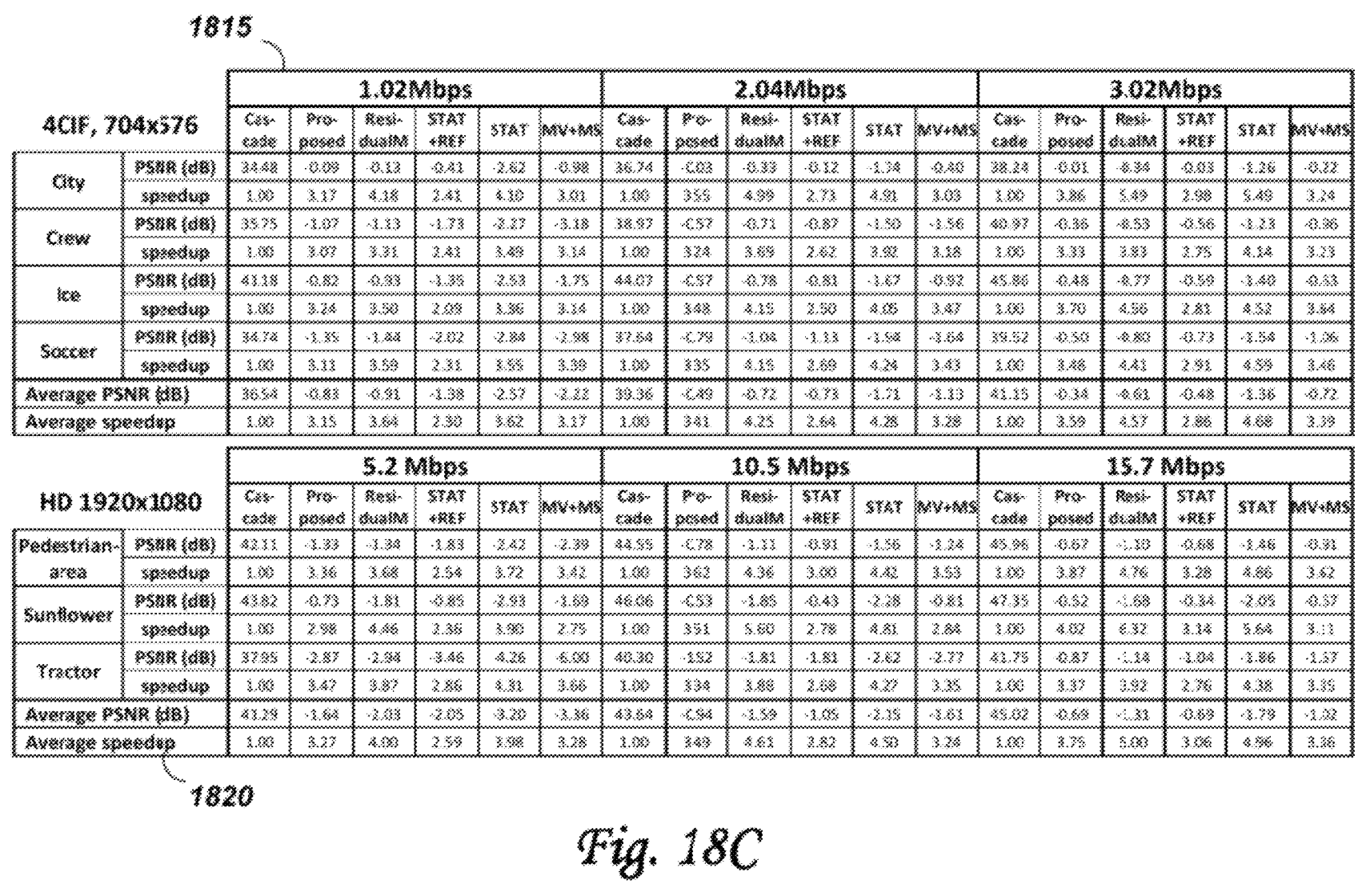

The simulation results are shown graphically in FIGS. 16 and 17, and tabulated in FIGS. 18A-C.

FIG. 16 shows a graph 1600, showing results for PSNR in dB (vertical scale 1605) and speedup (vertical scale 1610) for transcoding the QCIF Miss-America video as a function of bitrate in kbps (horizontal scale 1615), according to different transcoding methods. Speedup values are defined as a ratio $T_{cascade}/T_{method}$, with T representing the transcoding (CPU) time. The legend lists prior methods and the proposed method as follows: Cascade 1620, Stat+ref 1625, MV+MS 1630, the Proposed method 1635, Stat 1640, and ResidualM (our earlier proposal) 1645. The PSNR values are represented as curves 1650, while the speedup values are represented as groups of histogram bars 1655, corresponding to each bitrate. The order of the bars showing the speedup results in each group is the same as the order in which the corresponding methods are listed in the legend. The PSNR values shown above and below the curves 1650 are the PSNR results of the cascade method 1620 and the proposed method 1635, respectively.

In a similar format, FIG. 17 is a graph 1700, showing results for PSNR in dB (vertical scale 1705) and speedup (vertical scale 1710) for transcoding the CIF Highway video as a function of bitrate in kbps (horizontal scale 1715) according to different transcoding methods. Speedup values are defined as a ratio $T_{cascade}/T_{method}$, with T representing the transcoding (CPU) time. The legend lists prior methods and the proposed method as follows: Cascade 1720, Stat+ref 1725, MV+MS 1730, the Proposed method 1735, Stat 1740, and ResidualM (our earlier proposal described in the parent patent application Ser. No. 12/633,050 cited above) 1745. The PSNR values are represented as curves 1750, while the speedup values are represented as groups of histogram bars 1755, corresponding to each bitrate. The order of the bars showing the speedup results in each group is the same as the order in which the corresponding methods are listed in the legend. The PSNR values shown above and below the curves 1750 are the PSNR results of the cascade method 1720 and the proposed method 1735, respectively.

FIGS. 18A, 18B and 18C show tabulations of PSNR and speedup simulation results for various QCIF, CIF, 4CIF and HD video sequences. The simulations were performed for the following set of methods: the proposed algorithm, the residualM method (our earlier proposal described in the parent patent application Ser. No. 12/633,050 cited above), STAT (the statistical method without MV refinement according to Y. K. Lee, S. S. Lee and Y. L. Lee, "MPEG-4 to H.264 Transcoding using Macroblock Statistics," *IEEE International Conference on Multimedia and Expo*, pp. 57-60, July 2006), STAT+REF (the statistical method with MV refinement, also according to Y. K. Lee et al.), and MV+MS (the method Selection Mode with MV refinement according to Y. Liang, X. Wei, I. Ahmad and V. Swaminahan, "MPEG-4 to H.264/AVC Transcoding," *The International Wireless Communications and Mobile Computing Conference*, pp. 689-693, August 2007, cited earlier).

Each of FIGS. 18A, 18B, and 18C shows PSNR and transcoding speedup results for different video sequences at various bitrates; for each of the transcoding methods, where each PSNR row shows differences of each simulated method relative to the PSNR of the cascade method, and each speedup row lists the corresponding speedups which are defined as $T_{cascade}/T_{method}$, with T representing the transcoding (CPU) time of each case. In addition, FIG. 18A shows results table 1805 for CIF videos "Bus", "Crew", "Football", "Foreman", "Highway", and "M. Daughter" for bitrates of 32 kbs, 128 kbs, and 192 kbs;

FIG. 18B shows results table 1810 for QCIF videos "Carphone", "Claire", "Foreman", "Hall", "Miss-America", and "Suzie" for bitrates of 128 kbs, 512 kbs, and 768 kbs; and FIG. 18C shows results table 1815 for 4CIF, 704×576 videos "City", "Crew", "Ice", and "Soccer" for bitrates of 1.02 Mbs, 2.04 Mbs, and 3.02 Mbs, as well as results table 1820 for HD 1920×1080 videos "Pedestrian-area", "Sunflower", and "Tractor" for bitrates of 5.2 Mbs, 10.5 Mbs, and 15.7 Mbs.

For QCIF, CIF, 4CIF and HD 1920×1080p videos, the algorithm provided an average quality loss of −0.45 dB, −1.09 dB, −0.83 dB and −1.64 dB, respectively, at low bit rate. For medium and high bit rates, we obtained −0.15 dB, −0.31 dB, −0.4 dB, −0.8 dB, respectively, as compared to the cascade method. Still, good speedups were obtained (3.4× on average). Compared to the other existing methods, the proposed algorithm provides the best quality for all bit rates. Moreover, it provides better speedups than STAT+REF, and MV+MS. The STAT algorithm provides better speedups, but at the expense of a very high reduction in quality (which may be unacceptable in many applications), with a PSNR difference of as much as −4 dB in some instances, as compared to the cascade method. The ResidualM algorithm, proposed in our earlier work, also provides better speedups (from 3.3× to 5.48×), but the quality degradation is however higher than the proposed method of the present invention, especially at higher bit rates. Also, by analyzing the results of individual videos, we can observe that the quality improvement of the method of the embodiments of the present invention over ResidualM is especially noticeable for low motion videos and at high bit rates (e.g., 0.64 dB improvement for QCIF Miss-America, and 1.32 dB for HD Sunflower).

The improvement in quality, over ResidualM, at high bit rates is mostly due to the consideration of smaller partitions such as Inter16×8, Inter8×16 and Inter8×8. Although performed selectively, it also explains our lower speedups as compared to ResidualM. The method of the embodiments of the present invention provides the best quality, especially for videos with low motion or spatial details. This can be explained by the fact that our algorithm uses CM classification and MV refinement thresholds adapted to the video characteristics. Therefore, regions with small absolute residual energy can still be refined if they are complex relative to the other MBs in the frame. We believe that both the proposed and the ResidualM algorithms are attractive for real-time transcoding, and one may prefer one or the other, depending on the application requirements in terms of quality and speed.

It is important to note that (other) experimental results presented for example in ISO/IEC 14496-5:2001, "Information technology—Coding of audio-visual objects—Part 5: Reference software," second edition, February 2005, and in H.264/AVC reference software JM 15.1, obtainable from http://iphome.hhi.de/suehring/tml/, were obtained using the MoMuSys and JM reference codecs respectively. Using more optimized codecs, such as those used in this paper, leads to much smaller speedups. For example, in the work of Y. Liang et al. (Y. Liang, X. Wei, I. Ahmad and V. Swaminahan, "MPEG-4 to H.264/AVC Transcoding," *The International Wireless Communications and Mobile Computing Conference*, pp. 689-693, August 2007, cited above) using the (MV+MS) method, the author obtained an average speedup of 10.36 ×, and when using the Intel codecs in our simulation, the speedup was around 3.2×. The method of the embodiments of the present invention would therefore exhibit much higher speedups with MoMuSys and the JM. But that may not be representative of real-life products.

System Implementation

Figure 19:
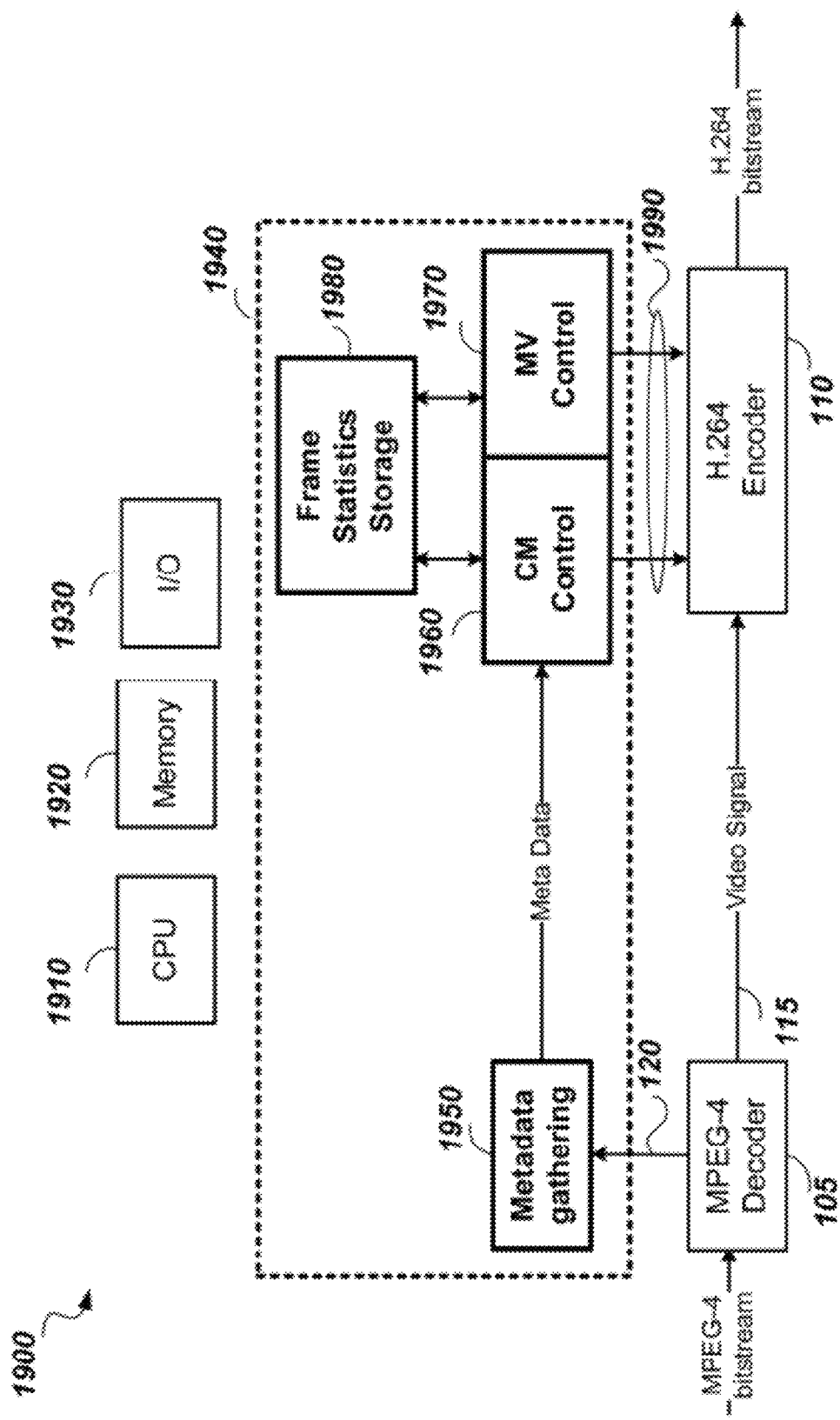
FIG. 19 shows an enhanced video transcoder system 1900 according to an embodiment of the invention.

FIG. 19 shows an enhanced video transcoder system 1900 according to an embodiment of the invention, including: a CPU 1910; a non-transitory memory 1920; an input-output (I/O) sub-system 1930; and a transcoder control sub-system 1940 which is connected the MPEG-4 Decoder 105 and the H.264 Encoder 110.

The transcoder control sub-system 1940 comprises: a Metadata gathering module 1950 which gathers metadata 120 from the MPEG-4 Decoder 105; a Coding Mode (CM) Control module 1960; a Motion Vector (MV) Control module 1970; and a Frame Statistics Storage module 1980.

The Metadata gathering module 1950 gathers metadata over the link 120 from the MPEG-4 Decoder 105, and forwards the collected metadata of each decoded MPEG-4 video frame to the a CM Control module 1960 and the MV Control module 1970. The CM Control module 1960 and the MV Control module 1970 send processed CM and MV information over a link 1990 into the H.264 Encoder.

The MPEG-4 Decoder 105 and the H.264 Encoder 110 perform transcoding of the MPEG-bitstream into the H.264 bitstream, while the improved transcoder control sub-system 1940 processes and generates coding mode and motion vector information for the H.264 Encoder to provide speed enhancement without significant loss of video quality, as described in detail above.

Statistics of parameters generated during the transcoding of each video frame, e.g. macro block sizes, coding modes, and motion vectors, are recorded in the Frame Statistics Storage module 1980, and are thus available for processing one or more subsequent video frames, as described in detail above.

The enhanced video transcoder system 1900 is a computer system with the CPU 1910 which executes instructions stored in the non-transitory memory 1920, according to the functionalities defined in the transcoder control sub-system 1940, as well as the MPEG-4 decoder 105 and the H.264 Encoder 110 which may use the I/O sub-system 1930 to receive the MPEG-4 bitstream and transmit the H.264 bitstream respectively.

All modules of the transcoder control system 1940, namely the Metadata gathering module 1950, the Coding Mode (CM) Control module 1960, the Motion Vector (MV) Control module 1970, and the Frame Statistics Storage module 1980 comprises computer readable instructions stored in the computer memory 1920 or another non-transitory computer readable storage medium, for execution by the CPU 1910.

It is also understood that variations and modifications can be made to the embodiments of the method and system described above. For example, statistics may be collected from one or more previous Inter frames in the sequence of Inter frames instead of the immediate previous Inter frame. Although the residual information has been determined as relative average residuals, it is understood that such calculations may be adjusted or modified as required as long as residual information is taken into account. Residual information may be computed over all macro blocks in a certain Inter frame, or only a sub-set of such macro blocks. Although the cost function has been illustrated as Lagrangian cost function, it is contemplated that other types of cost functions are also possible.

Although the embodiments of the invention have been described in detail, it will be apparent to one skilled in the art that variations and modifications to the embodiment may be made within the scope of the following claims.

What is claimed is:

1. A method of improving efficiency in transcoding a video sequence comprised of input Inter frames, each input Inter frame comprising one or more input macro blocks of pixels encoded in a first format, into a sequence of output Inter frames, each output Inter frame comprising one or more output macro blocks of pixels encoded in a second format, the method comprising:
   (a) determining a set of candidate coding modes for a macro block of the second format depending on coding modes used for coding macro blocks of the first format, comprising limiting the set of candidate coding modes based on comparison of residual information of a macro block of the first format, which is to be transcoded into the macro block in the second format, and residual information of two or more macro blocks of the first format already transcoded for one or more of the previous frames in the sequence of input frames;
   (b) determining, for each candidate coding mode in the set of the candidate coding modes, a value of a cost function, characterizing distortion and bitrate for the macro block;
   (c) selecting a coding mode for the macro block of the second format from among the set of the candidate coding modes, the selected coding mode having the lowest value of the cost function; and
   (d) refining motions vectors for the candidate coding modes except those where a coding mode for the macro block in the first format is the same as a coding mode for the macro block in the second format, and where a residual information of the macro block of the first format does not exceed a threshold associated with average relative residual information of two or more macro blocks of the first format already transcoded for one of the previous frames in the sequence of input frames, the macro block in the first format and the two or more macro blocks of the first format being coded in the same coding mode.

2. The method of claim 1, wherein the step (a) comprises determining the set of candidate coding modes based on the size of the macro block, coding modes of the macro block, and a position of an Inter frame containing the macro block in the sequence of input Inter frames.

3. The method of claim 1, wherein one of the previous frames is an immediately previous frame to a frame containing the macro block of the first format.

4. The method of claim 1, wherein the residual information for the macro block or for the two or more macro blocks is computed using less than all pixels of said two or more macro blocks.

5. The method of claim 1, wherein the two or more macro blocks of the first format from the one or more of the previous frames comprise all macro blocks of the first format.

6. The method of claim 1, wherein the limiting based on comparison comprises determining relative residual information for the macro block of the first format with respect to the residual information of the two or more macro blocks of the first format.

7. The method of claim 6, wherein the relative residual information is computed as a ratio of a first function of residuals of the macro block of the first format and a second function of residuals of the two or more macro blocks belonging to the same Inter frame as said macro block of the first format.

8. The method of claim 7, wherein the first function is a sum of absolute residuals, and the second function is an average sum of absolute residuals.

9. The method of claim 1, wherein the residual information of the two or more macro blocks of the first format is computed as average relative residual information over a combination of input and output coding modes.

10. The method of claim 6, wherein the relative residual information comprises adjusted relative average residual information of the two or more macro blocks coded with the same coding mode, an adjustment depending on the coding mode.

11. The method of claim 1, wherein the two or more macro blocks of the first format comprise macro blocks having been coded in the same coding mode as the macro block of the first format.

12. The method of claim 1, wherein the step (a) further comprises limiting the set candidate coding modes based on comparison between motion vectors for the macro block in the first format and predicted motion vectors for the macro block of the second format.

13. The method of claim 1, wherein the threshold is equal to one of the following:
the average relative residual information of the two or more macro blocks; or
a fraction of the average relative residual information of the two or more macro blocks.

14. The method of claim 1, wherein the first format is MPEG-4 and the second format is H.264.

15. The method of claim 1, wherein the cost function is a Lagrangian Cost Computation function.

16. The method of claim 1, wherein the threshold is computed as an adjusted average sum of absolute values for the residual (ASAR) information of two or more macro blocks of the first format already transcoded for one of the previous frames in the sequence of input Inter frames, the macro block in the first format and the two or more macro blocks of the first format being coded in the same coding mode.

17. A method of transcoding a video sequence comprised of input Inter frames, each input inter frame comprising one or more input macro blocks of pixels encoded in a first format, into a sequence of output Inter frames, each output Inter frame comprising one or more output macro blocks of pixels encoded in a second format, the method comprising:
(a) determining a set of candidate coding modes for a macro block of the second format based on comparison of residual information of a macro block of the first format to be transcoded into the macro block in the second format, and relative residual information of two or more macro blocks of the first format already transcoded for an Inter frame previous to a frame containing the macro block of the first format;
(b) refining motions vectors for the candidate coding modes except those where a coding mode for the macro block in the first format is the same as a coding mode for the macro block in the second format, and where a residual information of the macro block of the first format does not exceed a threshold associated with average relative residual information of two or more macro blocks of the first format already transcoded for one of the previous frames in the sequence of input frames, the macro block in the first format and the two or more macro blocks of the first format being coded in the same coding mode;
(c) determining, for each candidate coding mode in the set of the candidate coding modes, a value of a cost function, characterizing distortion depending on the refined motion vectors and a bitrate for the macro block; and
(d) selecting a coding mode for the macro block of the second format from among the set of the candidate coding modes, the selected coding mode having the lowest value of the cost function.

18. A video transcoder system for transcoding a video sequence comprised of input Inter frames, each input Inter frame comprising one or more input macro blocks of pixels encoded in a first format, into a sequence of output Inter frames, each output frame comprising one or more output macro blocks of pixels encoded in a second format, the system comprising:
a computer, having a non-transitory computer readable storage medium having computer executable instructions stored thereon for execution by the computer, forming:
a decoder for decoding the input Inter frames into a video signal;
an encoder for generating the output Inter frames by encoding the video signal;
a metadata gathering module, gathering metadata from the decoder, including input macro block information including residual information and coding modes of the first format;
a transcoder control sub-system comprising computer readable instructions causing the computer to:
(a) determine a set of candidate coding modes for a macro block of the second format depending on coding modes used for coding macro blocks of the first format, comprising limiting the set of candidate coding modes based on comparison of residual information of a macro block of the first format, which is to be transcoded into the macro block in the second format, and residual information of two or more macro blocks of the first format already transcoded for one or more of the previous frames in the sequence of input frames;
(b) determine, for each candidate coding mode in the set of the candidate coding modes, a value of a cost function, characterizing distortion and bitrate for the macro block; and
(c) select a coding mode for the macro block of the second format from among the set of the candidate coding modes, the selected coding mode having the lowest value of the cost function;
the system further comprising a motion vector control module having computer readable instructions causing the computer to refine motion vectors for the candidate coding modes except those where a coding mode for the macro block in the first format is the same as a coding mode for the macro block in the second format, and where a residual information of the macro block of the first format does not exceed a threshold associated with average relative residual information of two or more macro blocks of the first format already transcoded for one of the previous frames in the sequence of input frames, the macro block in the first format and the two or more macro blocks of the first format being coded in the same coding mode.

19. The system of claim 18, wherein the transcoder control sub-system comprises computer readable instructions further causing the computer to determine relative residual information for the macro block of the first format with respect to the residual information of the two or more macro blocks of the first format.

20. The system of claim 19, wherein the transcoder control sub-system comprises computer readable instructions further causing the computer to determine the relative residual information as a ratio of a first function of residuals of the macro block of the first format and a second function of residuals of the two or more macro blocks belonging to the same Inter frame as said macro block of the first format.

21. The system of claim 18, wherein the transcoder control sub-system comprises computer readable instructions further causing the computer to determine the residual information of the two or more macro blocks of the first format as average relative residual information over a combination of input and output coding modes.

22. The system of claim 18, further comprising a motion vector control module, limiting the set candidate coding modes based on comparison between motion vectors for the macro block in the first format and predicted motion vectors for the macro block in the second format.

23. The system of claim 18, wherein the threshold is equal to one of the following:

the average relative residual information of the two or more macro blocks; or a fraction of the average relative residual information of the two or more macro blocks.

24. The system of claim 18, wherein the first format is MPEG-4 and the second format is H.264.

25. The system of claim 18, wherein the cost function is a Lagrangian Cost Computation function.

26. The system of claim 18, wherein the threshold is computed as an adjusted average sum of absolute values for the residual (ASAR) information of two or more macro blocks of the first format already transcoded for one of the previous frames in the sequence of input Inter frames, the macro block in the first format and the two or more macro blocks of the first format being coded in the same coding mode.

* * * * *